United States Patent [19]

Otsuka et al.

[11] 3,873,511
[45] Mar. 25, 1975

[54] (1-α-AMINOISOBUTYRIC ACID)-CORTICOTROPIN PEPTIDES

[75] Inventors: Hideo Otsuka, Mino; Ken Inouye, Kobe, both of Japan

[73] Assignee: Shionogi & Co., Ltd., Osaka, Japan

[22] Filed: Mar. 15, 1971

[21] Appl. No.: 124,549

[30] Foreign Application Priority Data
Mar. 16, 1970 Japan.......................... 45-22190
May 7, 1970 Japan.......................... 45-38878

[52] U.S. Cl............................. 260/112.5, 424/177
[51] Int. Cl............................................ C07c 103/52
[58] Field of Search................................. 260/112.5

[56] References Cited
UNITED STATES PATENTS
3,388,112  6/1968  Geiger et al. .................... 260/112.5
3,503,951  3/1970  Iselin et al. ...................... 260/112.5
3,651,039  3/1972  Fujino et al. .................... 260/112.5

Primary Examiner—Elbert L. Roberts
Attorney, Agent, or Firm—Wenderoth, Lind & Ponack

[57] ABSTRACT

Highly active corticotropin peptides which have an α-aminoisobutyric acid residue at the amino-terminal in place of the serine in native corticotropin, derivatives thereof, intermediates therefor and compositions thereof are disclosed. Such peptides are useful as a medicament, because they show corticotropic properties remarkably improved in enhancement of potency and prolongation of action. They can be prepared by condensing the amino acids together one by one or by condensing the small peptide fragments together in per se conventional manner.

3 Claims, No Drawings

(1-α-AMINOISOBUTYRIC ACID)-CORTICOTROPIN PEPTIDES

This invention relates to novel corticotropin peptides having an α-aminoisobutyric acid as the N-terminal amino acid residue in place of the serine residue in native corticotropin, derivatives thereof, non-toxic acid additives salts thereof, intermediates therefor and complexes thereof. The [1-α-aminoisobutyric acid]-corticotropin peptides prepared by the present invention are useful for as a medicament, because they show marked biological activities such as adrenal-stimulating activity, melanocyte-stimulating activity and lipotropic activity.

In the course of the investigations on corticotropin peptides, it has been discovered by the present inventors that the amino-terminal substitution by α-aminoisobutyric acid in a corticotropin peptide improves greatly its biological properties and results in enhancement of potency and prolongation of action. It has been discovered that such improved properties are due to the decreased susceptibility of the [1-α-aminoisobutyric acid]-corticotropin peptide toward the action of intracellular aminopeptidase. The present invention is based on these observations.

According to the invention, the [1-α-aminoisobutyric acid]-corticotropin peptides can be prepared by condensing the amino acids together one by one or by condensing the small peptide fragments together in a per se conventional manner. More particularly, they can be prepared by (a) reacting an amino acid ester or peptide ester having a free amino group with other amino acid or peptide having protected amino group(s) in the presence of a condensing agent, or (b) reacting an amino acid or peptide having a free amino group and protected or unprotected carboxyl group(s) with other amino acid or peptide having an activated carboxyl group and protected amino group(s), or (c) reacting an amino acid or peptide having a free carboxyl group and protected amino group(s) with other amino acid or peptide having an activated amino group and protected carboxyl group(s) and removing the protecting groups from the resulting protected peptide by hydrogenolysis, acidolysis, hydrolysis, hydrazinolysis, sodium in liquid ammonia reduction or other means.

Peptide-bonds are formed by the usual methods. Examples of said methods are the azide method, the dicyclohexylcarbodiimide method, the carbonyldiimidazole method, the mixed anhydride method, the activated ester method (e.g. p-nitrophenyl ester method, N-hydroxysuccinimide ester method, cyanomethyl ester method, p-nitrophenyl thiolester method, pentachlorophenyl ester method), the isoxazolium method, the N-carboxyanhydride method, the tetraethyl pyrophosphite method, the ethyl chlorophosphite method, a combined method thereof and the methods usually employed in the art. The desired peptides are also prepared by the so-called solid phase peptide synthesis. Although above-mentioned methods can be employed for the formation of any peptide bond in preparing the present corticotropin peptide, the most commonly practiced methods are the dicyclohexyl-carbodiimide method, the azide method, the mixed anhydride method and the activated ester method.

In the production of the [1-α-aminoisobutyric acid]-corticotropin peptides, any free functional groups not participating in the reaction are advantageously protected, especially by such groups that can be easily removed by hydrogenolysis, acidolysis, hydrazinolysis, hydrolysis or sodium in liquid ammonia reduction. The carboxyl group is advantageously protected by esterification, for example, with a lower alkanol (e.g. methanol, ethanol, propanol, isopropanol, t-butanol) or an aralkanol (e.g. benzyl alcohol, p-nitrobenzyl alcohol, p-methoxybenzyl alcohol) or by amide formation. These carboxyl-protecting groups are introduced by the usual methods.

The amino group is protected preferably by introducing a group such as t-butyloxycarbonyl group, t-amyloxycarbonyl group, o-nitrophenylsulfenyl group, 2-(p-diphenyl)-isopropyloxycarbonyl group, benzyloxycarbonyl group, p-nitrobenzyloxycarbonyl group, p-methoxybenzyloxycarbonyl group, tosyl group, formyl group or trityl group, in a conventional manner. For protection of the guanidyl group of arginine, nitro group, tosyl group or adamantyloxycarbonyl group is preferably employed, but the protection of the guanidyl group is not always necessary. The ω-amino group of lysine or ornithine is advantageously protected by such amino-protecting groups as those mentioned above. The ω-carboxyl group of glutamic acid or aspartic acid is preferably protected by such carboxyl-protecting groups as mentioned above, and the imidazole group of histidine may be protected by tosyl group, benzyloxycarbonyl group, benzyl group or the like. Further, the hydroxyl group of serine or tyrosine may be protected by acetyl group, benzyl group or t-butyl group, but such protection is not always necessary.

The [1-α-aminoisobutyric acid]-corticotropin peptide according to the invention generally contains the 1-16 to 1-39 amino acid residues, especially the 1-18 to 1-27 amino acid residues of the corticotropin molecule. In addition to the amino-terminal substitution, some other amino acid residues of the sequence may be further replaced by other different amino acids, without impairing substantially the corticotropic activity. For example, the 4th amino acid, methionine, may be replaced by norvaline, norleucine, leucine or α-aminobutyric acid; the 5-glutamic acid by glutamine; the 15- and/or 16-lysine by ornithine; the 17- and/or 18-arginine by lysine or ornithine; and/or the 25-aspartic acid by valine.

Among the corticotropin peptides of the invention, preferred are those represented by the general formula (I): α-aminoisobutyryl-L-trosyl-L-seryl-A-B-L-histidyl-L-phenylalanyl-L-arginyl-L-tryptophyl-glycyl-L-lysyl-L-prolyl-L-valyl-glycyl-C-D-E-F wherein A is L-methionine residue, L-norvaline residue, L-norleucine residue, L-leucine residue or α-aminobutyric acid residue; B is L-glutamic acid residue or L-glutamine residue; C and D each is L-lysine residue or L-ornithine residue; E is L-arginine residue, L-lysine residue or L-ornithine residue; and F is L-arginine residue, L-arginyl-L-proline residue, L-arginyl-L-prolyl-L-valine residue, L-arginyl-L-prolyl-L-valyl-L-lysine residue, L-arginyl-L-prolyl-L-valyl-L-lysyl-L-valine residue, L-arginyl-L-prolyl-L-valyl-L-lysyl-L-valyl-L-tyrosine residue, L-arginyl-L-prolyl-L-valyl-L-lysyl-L-valyl-L-tyrosyl-L-proline residue, L-arginyl-L-prolyl-L-valyl-L-lysyl-L-valyl-L-tyrosyl-L-prolyl-L-aspartic acid residue, L-arginyl-L-prolyl-L-valyl-L-lysyl-L-valyl-L-tyrosyl-L-prolyl-L-valine residue, L-arginyl-L-prolyl-L-valyl-L-lysyl-L-valyl-L-trosyl-L-prolyl-L-aspartyl-L-alanine residue, L-arginyl-L-prolyl-L-valyl-L-lysyl-L- valyl-L-tyroslyl-L-prolyl-L-aspartyl-L-alanyl-glycine residue, L-arginyl-L-prolyl-L-valyl-L-lysyl-L-valyl-L-tyrosyl-L-prolyl-L-aspartyl-glycyl-L-glutamic acid residue, L-arginyl-L-prolyl-L-valyl-L-lysyl-L-valyl-L-tyrosyl-L-prolyl-L-alanyl-glycyl-L-glutamic acid residue, L-arginyl-L-prolyl-L-valyl-L-lysyl-L-valyl-L-tyrosyl-L-prolyl-L-aspartyl-glycyl-L-glutamic acid residue, L-arginyl-L-prolyl-L-valyl-L-lysyl-L-valyl-L-tyrosyl-L-prolyl-L-aspartyl-glycyl-L-alanine residue, the corresponding amides or the corresponding esters.

The peptide (I) can be prepared by reacting an amino acid ester or peptide ester having a free amino group with other amino acid or peptide having protected amino group(s) in the presence of a condensing agent, or by reacting an amino acid or peptide having a free amino group and protected or unprotected carboxyl group(s) with other amino acid or peptide having an activated carboxyl group and protected amino group(s), or by reacting an amino acid or peptide having a free carboxyl group and protected amino group(s) with other amino acid or peptide having an activated amino group and protected carboxyl group(s), in the order of amino acid sequence as indicated above.

The final coupling reaction for producing the peptide (I) is performed, for example, by condensing a protected decapeptide of the formula: $R_1$-α-aminoisobutyryl-O-$R_2$-L-tyrosyl-L-seryl-A-γ-$R_3$-L-glutamyl-L-histidyl-L-phenylalanyl-L-arginyl-L-tryptophylglycine wherein $R_1$ is an amino-protecting group; $R_2$ is a hydroxyl-protecting group; $R_3$ is a carboxyl-protecting group; and A has the same meaning as defined above, with a protected peptide of the formula: N-$R_4$-L-lysyl-L-prolyl-L-valyl-glycyl-N-$R_5$-C-N-$R_6$-D-E'-F' wherein $R_4$, $R_5$ and $R_6$ each is an amino-protecting group; E' is a protected or unprotected L-arginine, L-lysine or L-ornithine residue; and F' is a protected or unprotected amino acid residue or peptide residue as defined above, in an inert solvent at a temperature of −20°C to 60°C for about 2 hours to 7 days, and removing the protecting groups from the resulting protected peptide of the formula: $R_1$-α-aminoisobutyryl-0-$R_2$-L-tyrosyl-L-seryl-A-γ-$R_3$-L-glutamyl-L-histidyl-L-phenylalanyl-L-arginyl-L-tryprophyl-glycyl-N-$R_4$-L-lysyl-L-prolyl-L-valyl-glycyl-N-$R_5$-C-N-$R_6$-D-E'-F' wherein $R_1$, $R_2$, $R_3$, $R_4$, $R_5$, $R_6$, A, C, D, E' and F' each has the same meaning as defined above, in a per se conventional manner at a temperature of about −20°C to 60°C for about 30 minutes to 24 hours. The inert solvents are dimethylformamide, dimethylsulfoxide, dioxane, hexamethyl phosphortriamide, aqueous solvent thereof and a mixture thereof.

The preferred processes for the preparation of the octadecapeptide, the tetracosapeptide and the heptacosapeptide are shown in charts I, II and III.

Chart I: Preparation of the Octadecapeptide

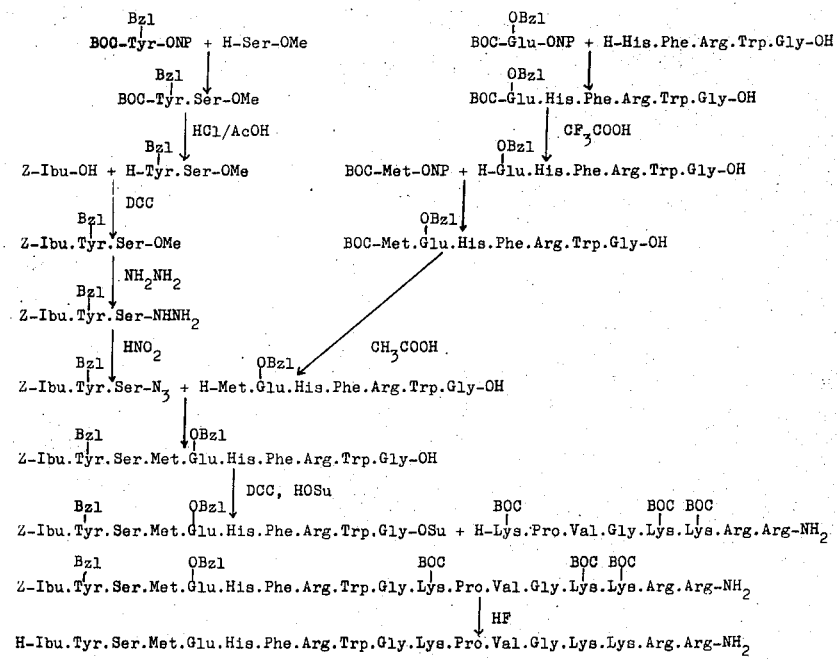

Chart II: Preparation of the Tetracosapeptide

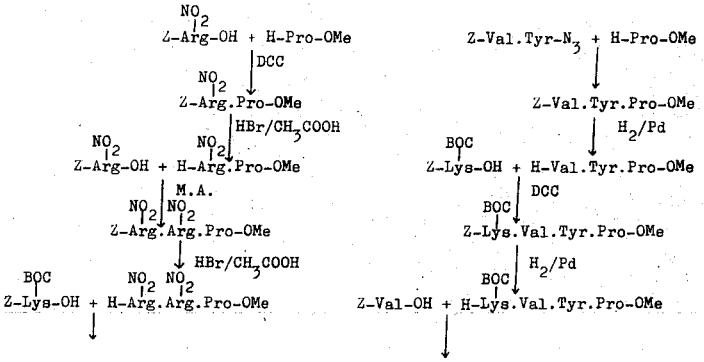

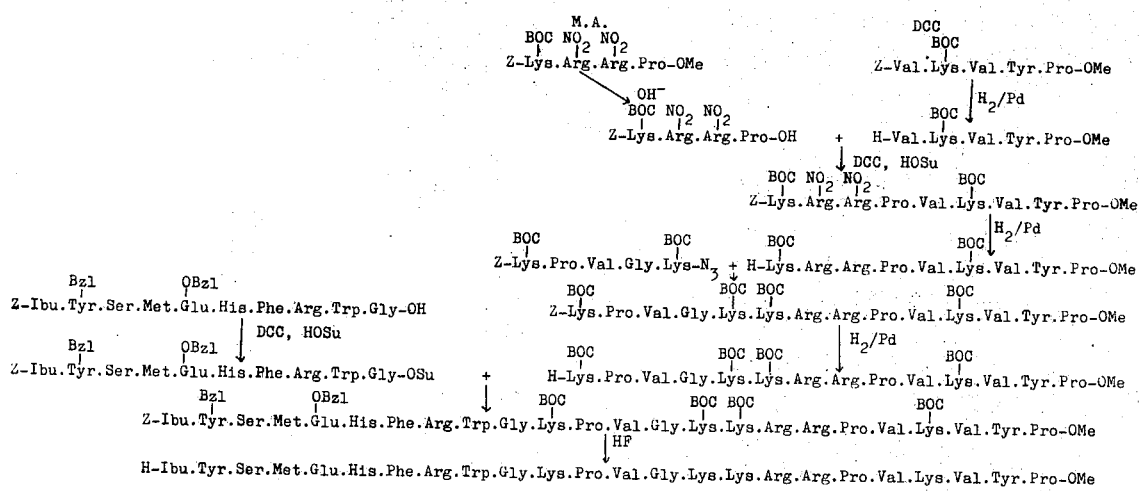
Chart III: Preparation of the Heptacosapeptide
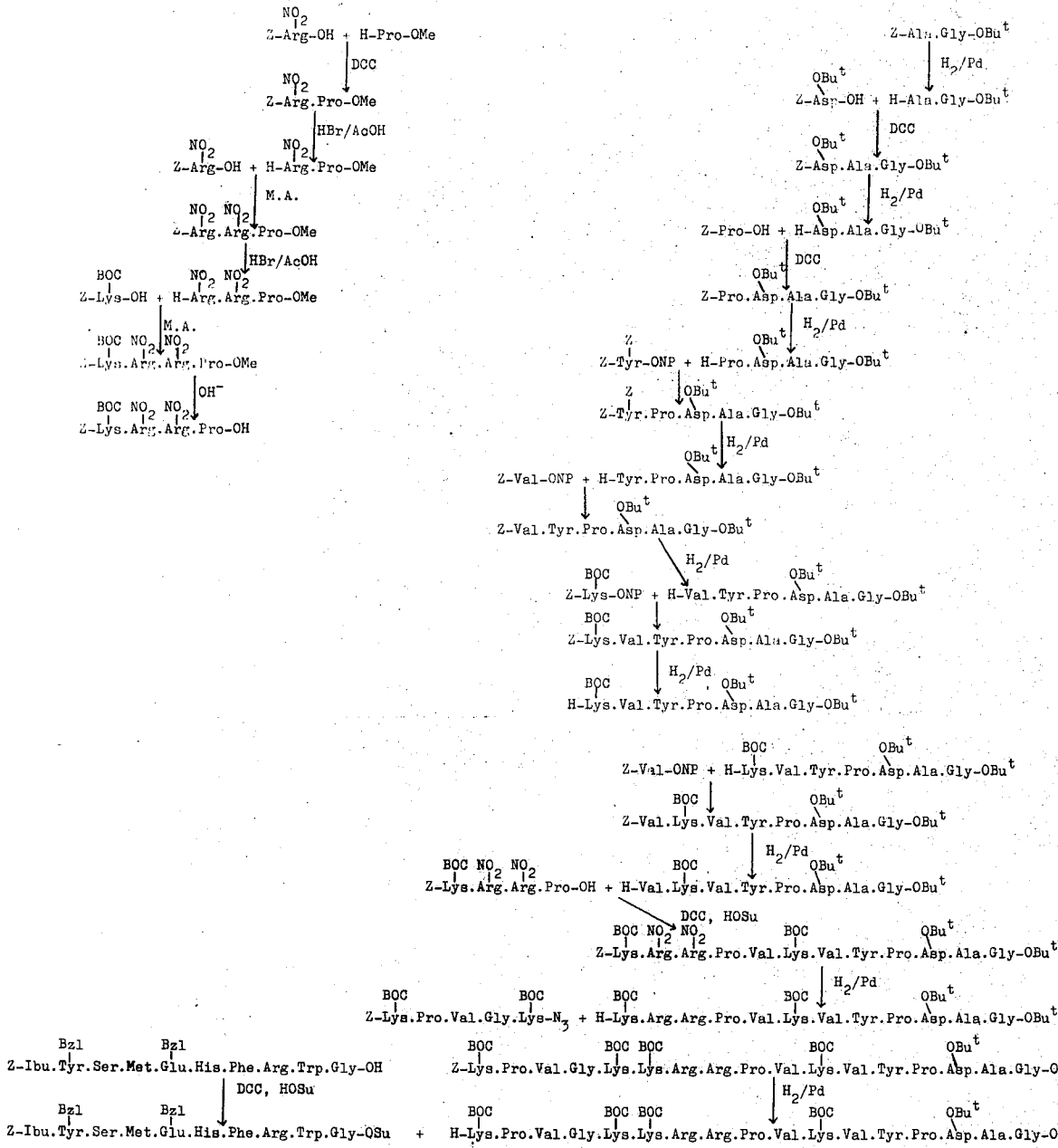

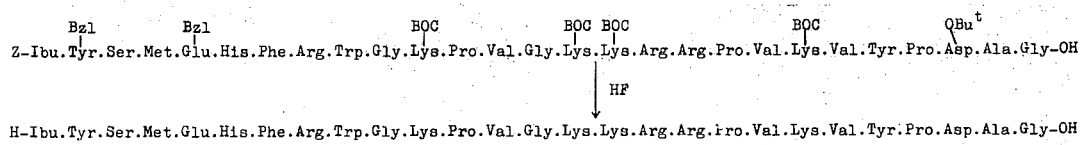

H-Ibu.Tyr.Ser.Met.Glu.His.Phe.Arg.Trp.Gly.Lys.Pro.Val.Gly.Lys.Lys.Arg.Arg.Pro.Val.Lys.Val.Tyr.Pro.Asp.Ala.Gly-OH

In the charts, the following abbreviations are used: Ibu=α—aminoisobutyric acid residue, Tyr=L—tyrosine residue, Ser=L—serine residue, Met=L—methionine residue, Glu=L—glutamic acid residue, His=L—histidine residue, Phe=L—phenylalanine residue, Arg=L—arginine residue, Trp=L—tryptophan residue, Gly=glycine residue, Lys=L—lysine residue, Pro=L—proline residue, Val=L—valine residue, Asp=L—aspartic acid residue, Ala=L—alanine residue, BOC=t—butyloxycarbonyl, Bzl=benzyl, OBu'=t—butoxy, DCC=N,N'—dicyclohexylcarbodiimide, Z= benzyloxycarbonyl, HOSu= N—hydroxysuccinimide, M.A.=mixed anhydride method, ONP=P-nitrophenoxy.

As has been shown in the charts, the preferred process involves the coupling of the tripeptide containing the first 3 amino acids, i.e. α-aminosobutyryl-L-tyrosyl-L-serine or the tetrapeptide, i.e. α-aminoisobutyryl-L-tyrosyl-L-seryl-L-methionine with the heptapeptide of the hexapeptide corresponding to the position 4-10 or 5-10, respectively, preferably by the azide method, whereupon the resulting decapeptide is condensed with the peptide corresponding to the rest of the molecule, that is the octapeptide (positions 11-18) in case of the manufacture of the octadecapeptide, the tetradecapeptide (positions 11-24) in case of the tetracosapeptide and the heptadecapeptide (positions 11-27) in case of the heptacosapeptide. The other [1-α-amino-isobutyric acid]-corticotropin peptides can be similarly prepared by condensing the amino-terminal decapeptide with the peptide corresponding to the carboxyl-terminal moiety.

The amino-terminal decapeptide, the tetrapeptide and the tripeptide are all novel compounds which have never been reported and are useful intermediates for the synthesis of corticotropin peptides of the invention.

Although the above mentioned procedure is the preferred one for the production of the present corticotropin peptides, it is possible to substitute the protecting groups, the coupling methods or the deprotection used above, for the equivalents or the equivalent methods and to appropriately change the positions and the order of coupling for fragment peptides.

Protecting groups employed in the present invention can be removed by hydrogenolysis, hydrolysis, hydrazinolysis, sodium in liquid ammonia reduction or by treatment with an acid such as trifluoroacetic acid, formic acid, hydrogen halide (e.g. hydrogen fluoride, hydrogen bromide, hydrogen chloride), hydrohalic acid (e.g. hydrofluoric acid, hydrobromic acid, hydrochloric acid) or a mixture thereof, in a conventional manner, depending upon the nature of the group.

The corticotropin peptides prepored by the present invention can be purified by methods known per se such as column chromatography with ion-exchange resin, ion-exchange cellulose or ion-exchange Sephadex or countercurrent distribution method.

The corticotropin peptides of the invention are produced in the form of base or of pharmaceutically acceptable non-toxic acid addition salt, depending on the reaction conditions used. Also, said salts can be prepared by treating the peptides with inorganic acids such as hydrohalic acid (e.g. hydrofluoric acid, hydrobromic acid, hydrochloric acid), hydrogen halide (e.g. hydrogen fluoride, hydrogen bromide, hydrogen chloride), sulfuric acid or phosphoric acid, or with organic acids such as acetic acid, formic acid, propionic acid, glycolic acid, lactic acid, pyruvic acid, oxalic acid, malonic acid, succinic acid, maleic acid, fumaric acid, tartaric acid, citric acid, benzoic acid, methanesulfonic acid, benzenesulfonic acid or toluenesulfonic acid, in a conventional manner. An equimolar or excess amount of acid may be used in salt formation.

The [1-α-aminoisobutyric acid]-corticotropin peptides thus obtained show marked biological activities including adrenal-stimulating activity, lipotropic activity and melanocyte-stimulating activity, and these are superior to those of native corticotropin and those of the related peptides ever known.

Assays for adrenal-stimulating activities of the present corticotropin peptides were carried out according to the five different methods, comparing with that of native sheep corticotropin ($\alpha_s$—ACTH) and Gly$^1$—ACTH(118)—NH$_2$ [Bull. Chem. Soc. Japan 43 196 (1970)]. The adrenal ascorbic acid depleting activity in the hypophysectomized rat was assayed by the method of United States Pharmacopeia XVII, 147 (1965). The in vivo steroidogenic acitivity by the intravenous administration to hypophysectomized rat was assayed by the method Lipcom and Nelson [Endocrinol., 71 13 (1962)] with a minor modification [A. Tanaka and C H. Li, Endocrinol. Japonica 13 180 (1966)]. The in vivo steroidogenic activity was also assayed in the dexamethasone-pentobarbital-primed mouse [A. Tanaka and N. Nakamura, "Integrative mechanism of neuroendocrine system, " Hokkaido University Medical Library Series, 1 49 (1968)]. In addition, the steroidogenic activity by the intramuscular administration to hypophysectomized rat was determined, where a peptide preparation was injected into the thigh muscle and a blood sample was collected from the abdominal aorta 30 minutes after injection. Futhermore, the steroidogenic activity by the intravenous adminstration to hypophysectomized rat was determined in such a manner that a peptide preparation was injected into the femoral vein and a blood sample was collected from the abdominal aorta 30 minutes after injection. Throughout the experiments, the Third USP Corticotropin Reference Standard was used as a standard and the production of 11-hydroxycorticosteroids (11-OHCS) was determined by the fluorophotometric method of peterson [J. Biol. Chem. 225 25 (1957)]. For each assay method several determinations were usually performed and the data obtained independently were submitted to the statistical treatment of Sheps and Moore procedure [J. Pharmacol. Extl. Therap. 128 99 (1960)]. The results of these assays on the present corticotropin peptides are given in Table 1, comparing with those of natural corticotropin ($\beta_s$—ACTH) and related known corticotropin peptide Gly$^1$—ACTH(1-18)— NH$_2$.

TABLE 1

Adrenal-stimulating activities of synthetic corticotropin peptides and natural corticotropin

| Method | Administration route | Peptide I | II | III | Gly$^1$-ACTH (1–18)-NH$_2$ | $\alpha_s$-ACTH |
|---|---|---|---|---|---|---|
| Adrenal-ascorbic acid depletion | subcutaneous | 286 | 250 | — | 26 | |
| In vivo steroidogenesis in: | | | | | | 100 |
| adrenal cannulation | intravenous | 480 | 305 | — | 151 | 180 |
| dexamethasone-nembutal-blocked mouse | intravenous | 757 | 360 | — | 170 | |
| peripheral blood | intravenous | 590 | 380 | 325 | 177 | |
| peripheral blood | intramuscular | 495 | 318 | 320 | 50 | |

Note: The activities are expressed in USF unit/mg, relative to the Third USP Corticotropin Reference Standard.
I=Ibu$^1$-ACTH(1–18)-NH$_2$, II=Ibu$^1$-Orn$^{15}$-ACTH(1–18)-NH$_2$, III=Ibu$^1$-ACTH(1–27)-OH.

As shown in Table 1, the corticotropin peptides prepared by the present invention are highly active in any respect to the adrenal-stimulating activities. The potency is more than twice that of Gly$^1$-ACTH(1–18)—NH$_2$ and natural corticotropin, when assayed by the adrenal ascorbic acid depletion method and by the in vivo steroidogenesis method. In addition, it is to be noted that the activities of I, II and III, estimated by the 11-Hydroxycorticosteroid level in rat peripheral blood, are unchanged whether the peptides are administered intravenously or intramuscularly. In Gly$^1$—ACTH-(1—18)—NH$_2$, however, the potency ratio of intramuscular vs. intravenous administration is approximately ⅓. These facts mean that the [1-$\alpha$-aminoisobutyric acid]-corticotropin peptides of the invention are more resistant to the action of aminopeptidase in the tissue than the 1-glycine analogue.

The corticotropin peptides of the invention show marked lipotropic activity, which is summarized in Table 2 and compared with those of Gly$^1$-ACTH(1-18)—NH$_2$ and natural sheep corticotropin ($\alpha_s$—ACTH).

TABLE 2

Lipotropic activity of synthetic corticotropin peptides and natural sheep corticotropin

| Test animal | Minimum effective dose (10$^{-6}$mg/50 mg tissue) | | | | |
|---|---|---|---|---|---|
| | I | II | III | Gly$^1$-ACTH-(1–18)-NH$_2$ | $\alpha_s$-ACTH |
| Rat adipose tissue | 0.062 | 0.086 | 0.036 | 6.3 | 6.0 |
| Rabbit adipose tissue | 0.47 | 0.013 | 0.001 | 0.35 | 7.1 |

Note: The lipotropic activity was determined according to the method described by Tanaka et al [Arch.Biochem.Biophys.99 294 (1962)], with the rat epididymal and the rabbit perirenal adipose tissue. The increase of non-esterified fatty acid concentration in both medium and tissue is the parameter. The activity is expressed in terms of the minimal effective dose per 50 mg tissue. I=Ibu$^1$-ACTH(1–18)-NH$_2$, II=Ibu$^1$-Orn$^{15}$-ACTH(1–18)-NH$_2$, III=Ibu$^1$-ACTH(1–27)-OH.

Assay for in vitro melanocyte-stimulating activity of the [1-$\alpha$-aminoisobutyric acid]-corticotropin peptides was carried out according to the method by K. Shizume, A. B. Lerner and T. B. Fitzpatrick [Endocrinol. 54 553 (1954)], using isolated skin fragments of Rana pipiens frog. The results are given in Table 3, comparing with Gly$^1$—ACTH(1—18)-NH$_2$ and ACTH-(1—24)-OH (Synacthen, Ciba Ltd.). A pure preparation of native $\alpha$-melanocyte-stimulating hormone ($\alpha_s$-MSH) was used as a reference standard.

TABLE 3

In vitro melanocyte-stimulating activity of synthetic corticotropin peptides

| Test Compound | MSH activity (units/g) |
|---|---|
| Ibu$^1$-ACTH(1–18)-NH$_2$ | 0.8 × 10$^{10}$ |
| Ibu$^1$-Orn$^{15}$-ACTH(1–18)-NH$_2$ | 1.1 × 10$^{10}$ |
| Ibu$^1$-ACTH(1–27)-OH | 1.6 × 10$^9$ |
| ACTH(1–24)-OH | 2.1 × 10$^8$ |
| Gly$^1$-ACTH(1–18)-NH$_2$ | 6.7 × 10$^8$ |

The melanocyte-stimulating activity of the present corticotropin peptides is higher than that of Glyh$^1$-ACTH(1–18)—NH$_2$ and ACTH(1–24)—OH.

Biological half-life of the corticotropin peptides and natural corticotropin was determined with the in vitro lipotropic activity [A. Tanaka, B. T. Pickering and C. H. Li, Arch. Biochem. Biophys. 99 294 (1962)] as a parameter. The results are summarized in Table 4.

TABLE 4

Half-life of corticotropin and related synthetic peptides as in vitro lipotropic agents

| Peptide | In vivo [a] (intravenous injection) | In vitro [b], incubated with | |
|---|---|---|---|
| | | Plasma | Muscle |
| Ibu[1]-ACTH(1–18)-NH$_2$ | 3.5 min. | 32.4 min. | 122.9 min. |
| Ibu[1]-Orn[15]-ACTH-(1–18)-NH$_2$ | 6.0 min. | 97.6 min. | 261.8 min. |
| Ibu[1]-ACTH(1–27)-OH | 6.5 min. | 79.3 min. | 91.2 min. |
| ACTH | 4.4 min. | 59.2 min. | 250.9 min. |
| Gly[1]-ACTH(1–18)-NH$_2$ | 1.9 min. | 30.0 min. | 42.6 min. |

[a] A peptide sample was injected intravenously into vena cava inferior of rats, and blood samples, which were collected from abdominal aorta in appropriate time intervals and were acidified, were assayed for the in vitro lipotropic activity.

[b] A sample was dissolved in the fresh plasma from anesthetized rat or in the Krebs-Ringer bicarbonate buffer containing thigh muscle slices of rat, bovine serum albumin and glucose. These mixtures were then incubated at 37°C and the aliquots taken from the mixtures in appropriate time intervals were assayed for the in vitro lipotropic activity.

The data listed above show that the half-lives of [1α-aminoisobutyric acid]-corticotropin peptides are almost the same as those of natural corticotropin and are strikingly longer than those of Gly[1]—ACTH(1–18-)—NH$_2$, demonstrating that the amino-terminal substitution by α-aminoisobutyric acid in a corticotropin peptide improves its biological properties greatly in prolongation of action and enhancement of potency.

The [1-α-aminoisobutyric acid]-corticotropin peptides prepared by the present invention can be converted into the corresponding complex with a complex-forming heavy metal (e.g. zinc, copper, iron, nickel, cobalt), a complex-forming polyamino acid (e.g. poly-glutamic acid, poly-aspartic acid, copolyglutamyl-tyrosine, copoly-aspartyl-glutamic acid) or with a mixture thereof. The complex shows an excellent long-acting property over the plain peptide. The heavy metal complex can be prepared by treating the present corticotropin peptide with a heavy metal compound such as heavy metal halide (e.g. zinc chloride, copper chloride, iron chloride, cobalt chloride, nickel chloride), acetate (e.g. zinc acetate), sulfate (e.g. zinc sulfate) or hydroxide (e.g. zinc hydroxide) in an approximate proportion of 1:0.1–100 by weight under weakly acidic condition, preferably at pH 6.5 to 7.0, in a conventional manner. Among the heavy metals, zince is most preferred. The polyamino acid complex can be prepared by treating the present corticotropin peptide with a polyamino acid in a proportion of 1:0.1–100 by weight under weakly acidic condition, preferably at pH 6.5 to 7.0, in a conventional manner. The polyamino acids used are homopolymer or copolymer of amino acids and they may be of the L-, D-, or DL-configuration. Examples of the preferred polyamino acids are poly-L-glutamic acid, poly-D-glutamic acid, poly-DL-glutamic acid, poly-L-aspartic acid, poly-D-aspartic acid, poly-DL-aspartic acid, copolyl-L-glutamyl-L-tyrosine and copoly-L-aspartyl-L-glutamic acid. Preferred molecular weight of the polyamino acid is approximately 1,000 to 100,000, particularly 2,000 to 6,000. It is preferred to use the polyamino acid which has been previously neutralized with an alkali (e.g. sodium hydroxide). Other suitable additives such as preservative (e.g. benzyl alcohol, phenol, thimerosal), buffer (e.g. citrate, phosphate, carbonate) or isotonizing agent (e.g. sodium chloride may be added to the preparation of the complex.

It should be noted that the test data described above are shown only as examples. Since the other compounds of this invention as well as those described above have almost the same characteristics and advantages as medicament, the ]1-α-aminoisobutyric acid]-corticotropin peptides of this invention are highly useful and advantages for the therapeutical purposes, e.g. treatment of acute or chronic articular rheumatisms, allergic deseases or adrenarches of human beings and domestic animals, or for the test of adrenocortical function.

Thus, the present corticotropin peptides, the acid addition salts and the complexes can be administered orally or parenterally in per se conventional forms, e.g. injection, liquid, suspension, emulsion or aerosol, optionally with suitable carriers, stabilizers, emulsifiers, preservatives, buffers, isotonizing agents and/or wetting agents, where a therapeutically active amount of the active ingredient is contained.

The effective dose can be easily determined by the physicians on the basis of the data hereindescribed. For example, a typical clinical dose range of the peptides of the invention is approximately 0.2 U/kg to 0.8 U/kg for a normal adult. The present corticotropin peptide is advantageously administered in the dosage form of an injection, and administration is repeated as often as required in accordance with the physician's indication.

The following examples are given solely for the purpose of illustration and are not to be construed as limitation of this invention, many variations of which are possible.

EXAMPLE 1 a. Benzyloxycarbonyl-α-aminoisobutyric acid

To a solution of α-aminoisobutyric acid (5.16 g) and anhydrous sodium carbonate (5.30 g) in N sodium hydroxide (50 ml) is added benzyl chloroformate (9.39 g) at 0°C, and the mixture is stirred for 3 hours. The reaction mixture is washed with ether to remove the excess reagent, acidified with 6N hydrochloric acid and extracted with ethyl acetate. The organic extracts are combined, dried over sodium sulfate and evaporated under reduced pressure to give a crystalline residue, which is recrystallized from ethyl acetate-petroleum ether to give 8.75 g of the desired product, melting at 65° to 66°C.

Anal. Calcd. for $C_{12}H_{15}NO_4$; C, 60.75; H, 6,37; N, 5.90.

Found: C, 61.04; H, 6.36; N, 6.07.

b. t-Butyloxycarbonyl-α-aminoisobutyric acid

To a solution of α-aminoisobutyric acid (4.75 g) and sodium bicarbonate (4.25 g) in N sodium hydroxide (46 ml) and dioxane (30 ml) is added dropwise a dioxane solution of t-butyl azidoformate (7.25 g), and the mixture is stirred at 40° to 50°C for 5 days. An additional quantity of t-butyl azidoformate (6.6 g) and N sodium hydroxide (46 ml) is introduced and the mixture is stirred for 2 days at the same temperature. The reaction mixture is concentrated under reduced pressure to remove the organic solvent. The concentrate is chilled and acidified with ice-cold 4N hydrochloric acid to pH 3. The solution is extracted with ethyl acetate and the organic solution is dried over sodium sulfate. After evaporation of the solution, the resulting crystals are recrystallized from ether to yield 0.82 g of the desired product, melting at 119° to 120°C.

Anal. Calcd. for $C_9H_{17}NO_4$: C, 53.19; H, 8.43; N, 6.89.

Found: C, 53.64; H, 8.39; N, 7.19.

c. t-Butyloxycarbonyl-O-benzyl-L-tyrosine p-nitrophenyl ester

To a solution of t-butyloxycarbonyl-O-benzyl-L-tyrosine (2.97 g) and p-nitrophenol (1.12 g) in ethyl acetate is added an ethyl acetate solution of N,N'-dicyclohexylcarbodiimide (1.65 g) at 0°C, and the mixture is kept at 4°C for 3 hours. The dicyclohexylurea separated is removed by filtration, and the filtrate is evaporated under reduced pressure. The resulting solid residue is suspended in hot ethanol and the crystals precipitated on cooling are filtered off, washed with cold ethanol and dried under reduced pressure to give the desired active ester (3.39 g), melting at 140 to 141°C. $[\alpha]_D^{22} -0.3°\pm0.4°$ (c=0.983, ethyl acetate).

Anal. Calcd. for $C_{27}H_{28}N_2O_7$: C, 65.84; H, 5.73; N, 5.69.

Found: C, 65.93; H, 5.73; N, 5.67.

d. Benzyloxycarbonyl-α-aminoisobutyryl-L-tyrosine hydrazide

Benzyloxycarbonyl-α-aminoisobutyric acid (1.54 g) and L-tyrosine methyl ester (1.27 g) are dissolved in acetonitrile, and to the solution is added a solution of N,N'-dicyclohexylcarbodiimide (1.34 g) in acetonitrile at 0°C. The mixture is kept at 4°C overnight. The N,N'-dicyclohexylurea precipitated is removed by filtration, and the filtrate is evaporated under reduced pressure to give a residue, which is dissolved in ethyl acetate. The solution is washed with N hydrochloric acid and 5% sodium bicarbonate, dried over sodium sulfate and evaporated under reduced pressure to give the dipeptide ester as a sirupy residue. The residue is dissolved in ethanol (15 ml) and hydrazine hydrate (0.8 ml) is added. After the reaction mixture has been kept at room temperature for 2 days, water is added to separate the desired dipeptide hydrazide as crystals (2.35 g). Recrystallization from aqueous ethanol gives the desired product, melting at 164° to 165°C. $[\alpha]_D^{27} -31.4°\pm0.7°$ (c=1.078, methanol).

Anal. Calcd. for $C_{21}H_{26}N_4O_5$: C, 60.86; H, 6.32; N, 13.52.

Found: C, 60.95; H, 6.41; N, 13.31.

e. t-Butyloxycarbonyl-O-benzyl-L-tyrosyl-L-serine methyl ester

To an ice-cold solution of L-serine methyl ester hydrochloride (1.03 g) in dimethylformamide (8 ml) is added triethylamine (0.92 ml), and the triethylamine hydrochloride separated is filtered off. t-Butyloxycarbonyl-O-benzyl-L-tyrosine p-nitrophenyl ester (2.96 g) is added to the filtrate with some dimethylformamide, and the mixture is kept at 4°C for 2 days. After removal of the solvent by evaporation under reduced pressure at a bath-temperature of 45° to 50°C, the residue is dissolved in ethyl acetate and the solution is washed successively with ice-cold N hydrochloric acid, water, 2N aqueous ammonia and water, dried over sodium sulfate and evaporated under reduced pressure. The resulting gelatinous mass is precipitated from ethyl acetate-petroleum ether. Reprecipitation from methanol-water affords the pure dipeptide (2.75 g), melting at 73° to 77°C. $[\alpha]_D^{22} +7.7°\pm0.5°$ (c=1.046, methanol).

Anal. Calcd. for $C_{25}H_{32}N_2O_7$: C, 63.54; H, 6.83; N, 5.93.

Found: C, 63.36; H, 6.97; N, 5.71.

f. Benzyloxycarbonyl-α-aminoisobutyryl-O-benzyl-L-tyrosyl-L-serine hydrazide t-Butyloxycarbonyl-O-benzyl-L-tyrosyl-L-serine methyl ester (2.08 g) is dissolved in N hydrogen chloride in acetic acid (20 ml), and the mixture is allowed to stand at room temperature for 30 minutes. Evaporation of the solvent gives an oily residue, which is solidified upon treatment with ether. The solid which has been filtered off is dissolved in a mixture of water (6 ml) and dichloromethane (20 ml), and to this solution is added ice-cold 50% potassium carbonate (6 ml). The mixture is shaken well and the organic phase is separated. The organic solution is dried over sodium sulfate and evaporated under reduced pressure.

The crystalline O-benzyl-L-tyrosyl-L-serine methyl ester obtained above is dissolved in acetonitrile along with benzyloxycarbonyl-α-aminoisobutyric acid (1.04 g), and to the solution is added an acetonitrile solution of N,N'-dicyclohexylcarbodiimide (0.91 g) at 0°C. The mixture is kept at 4°C overnight. The dicyclohexylurea separated is filtered off and the filtrate is evaporated under reduced pressure. The residue is dissolved in ethyl acetate, and the solution is washed successively with N hydrochloric acid, water and 5% sodium bicarbonate, dried over anhydrous sodium sulfate and evaporated under reduced pressure, to give the crude tripeptide ester which shows on a thin-layer chromatogram (in ethyl acetate) the presence of a smaller amount of additional component. The crude ester is then dissolved in ethanol (20 ml), and hydrazine hydrate (1.0 ml) is added. The reaction mixture is allowed to stand at room temperature for 2 days, and concentrated under reduced pressure. The residue is dissolved in ethyl acetate, washed with water and dried quickly over sodium sulfate. The precipitates separated on standing are filtered off, washed with cold ethyl acetate and ether, and dried under reduced pressure to give the desired hydrazide (1.91 g). Reprecipitation from ethanol gives the pure material, melting at 151° to 153°C. $[\alpha]_D^{22} -2.2°\pm0.4°$ (c=1.062, acetic acid).

Anal. Calcd. for $C_{31}H_{37}N_5O_7$: C, 62.93; H, 6.30; N, 11.84.

Found: C, 62.98; H, 6.31; N, 11.81.

g. t-Butyloxycarbonyl-γ-benzyl-L-glutamic acid p-nitrophenyl ester t-Butyloxycarbonyl-γ-benzyl-L-glutamic acid dicyclohexylamine salt (9.0 g) is shaken with Dowex 50W × 8 (H$^+$ form, wet volume 18 cc) in 60% ethanol for 30 minutes. After the resin has been removed by filtration, the filtrate is evaporated under reduced pressure to give a residue, which is dissolved in ether. The solution is dried over sodium sulfate and evaporated under reduced pressure to afford the free acid quantitatively. The acid is dissolved in ethyl acetate together with p- nitrophenol (2.4 g), and to this solution is added N,N'-dicyclohexylcarbodiimide (3.6 g) at 0°C. The reaction mixture is allowed to stand overnight. After removal of the precipitated dicyclohexylurea by filtration, the filtrate is evaporated under reduced pressure to give a residue, which is crystallized from ethanol. Recrystallization from the same solvent gives the active ester (7.0 g) in a pure form, melting at 118° to 119°C. $[\alpha]_D^{28}-33.1°\pm0.7°$ (c=1.082, methanol).

Anal. Calcd. for $C_{23}H_{26}NO_8$: C, 60.26; H, 5.72; N, 6.11.
Found: C, 60.38; H, 5.80; N, 6.29.

h.
t-Butyloxycarbonyl-γ-benzyl-L-glutamyl-L-histidyl-L-phenylalanyl-L-arginyl-L-tryptophyl-glycine To a solution of L-histidyl-L-phenylalanyl-L-arginyl-L-tryptophyl-glycine acetate (1.20 g) in dimethylformamide (10 ml) are added t-butyloxycarbonyl-γ-benzyl-L-glutamic acid p-nitrophenyl ester (1.03 g) and dimethylformamide (25 ml), and the mixture is kept at 4°C for 3 days. The resulting solution is added dropwise into a mixture of ethyl acetate-ether (1:1 by volume) (200 ml). The precipitates formed are collected by filtration, washed with ethyl acetate and ether, and dried under reduced pressure (yield 1.86 g). These precipitates are redissolved in 50% acetic acid (about 10 ml), and ethanol (about 100 ml) is added thereto. The resulting precipitates are collected by filtration and lyophilized from acetic acid to yield 1.37 g of the desired product. $[\alpha]_D^{22}-23.9°\pm0.6°$ (c=1.020, 50% acetic acid).

Anal. calcd. for $C_{51}H_{64}N_{12}O_{11}\cdot CH_3COOH\cdot 3H_2O$: C, 56.07; H, 6.57; N, 14.81; $CH_3CO$, 3.79. Found: C, 56.40; H, 6.22; N, 15.40; $CH_3CO$, 3.25.

The starting peptapeptide, i.e. L-histidyl-L-phenylalanyl-L-arginyl-L-tryptophyl-glycine can be prepared by the method described in Bull. Chem. Soc. Japan 38 1148 (1965) or Japanese Patent Application No. 17117/1969 or by the following method.

t-Butyloxycarbonyl-L-phenylalanyl-$N^G$-tosyl-L-arginyl-L-tryptophyl-glycine methyl ester t-Butyloxycarbonyl-L-phenylalanyl-$N^G$-tosyl-L-arginine hydrazide (5.9 g) [prepared by the method described in Bull. Chem. Soc. Japan 37 1465 (1964) ] is treated with sodium nitrite, and the azide precipitated is reacted with L-tryptophyl-glycine methyl ester [prepared by catalytic hydrogenation of benzyloxycarbonyl-L-tryptophyl-glycine methyl ester (4.1 g)] in ethyl acetate to give 5.3 g of the desired product, melting at 115° to 120°C. $[\alpha]_D^{27}-14.8°\pm0.3°$ (c=2.077, methanol).

Anal. Calcd. for $C_{41}H_{52}N_8O_9S$: C, 59.12; H, 6.29; N, 13.45; S, 3.85. Found: C, 58.82; H, 6.55; N, 13.15; S, 3.76.

Benzyloxycarbonyl-L-histidyl-L-phenylalanyl-$N^G$-tosyl-L-arginyl-L-tryptophyl-glycine methyl ester The tetrapeptide methyl ester (5.0 g) obtained above is treated with formic acid at room temperature for 4 hours. The resulting tetrapeptide ester is condensed with benzyloxycarbonyl-L-histidine azide (prepared from 2.7 g of the corresponding hydrazide). After completion of the reaction, the desired product is crystallized from ethanol. Yield 3.9 g; mp. 188°–190°C; $[\alpha]_D^{27}-23.4°\pm0.6°$ (c=1.037, dimethylformamide).

Anal. Calcd. for $C_{50}H_{57}N_{11}O_{10}S$: C, 59.81; H, 5.72; N, 15.34; S, 3.19. Found: C, 59.57; H, 5.59; N, 15.37; S, 3.27.

Benzyloxycarbonyl-L-histidyl-L-phenylalanyl-$N^G$-tosyl-L-arginyl-L-tryptophyl-glycine The pentapeptide ester (2.2 g) obtained above is saponified in aqueous methanol for 30 minutes by the use of two equivalent moles of sodium hydroxide. After completion of the reaction, the product is crystallized from aqueous methanol to give 1.6 g of the desired product, melting at 175° to 178°C. $[\alpha]_D^{27}-21.4°\pm0.6°$ (c=1.066, dimethylformamide).

Anal. Calcd. for $C_{49}H_{55}N_{11}O_{10}S\cdot H_2O$: C, 58.38; H, 5.70; N, 15.28; S, 3.18. Found: C, 57.95; H, 5.83; N, 15.19; S, 3.58.

L-Histidyl-L-phenylalanyl-L-arginyl-L-tryptophyl-glycine

The pentapeptide (1.23 g) obtained above is treated with hydrogen fluoride in the presence of anisole (1.3 ml) at 0°C for 30 minutes. The deblocked pentapeptide hydrochloride is passed through a column of Amberlite CG–400 (acetate form) to convert into the corresponding acetate. The acetate is passed through a column of carboxylmethyl cellulose and eluted with an ammonium acetate buffer having a linear concentration gradient from 0.01 to 0.1M. Yield 0.76 g; $[\alpha]_D^{27}-10.5°\pm1.0°$ (c=1.043, N hydrochloric acid).

Amino acid ratio by leucine aminopeptidase digestion: histidine 1.00, phenylalanine 1.00, arginine 1.02, tryptophan 1.00, glycine 1.07.

i. t-Butyloxycarbonyl-L-methionine p-nitrophenyl ester t-Butyloxycarbonyl-L-methionine dicyclohexylamine salt (10.8 g) is treated with Dowex 50W × 8 ($H^+$ form) in the same manner as described in Example 1(g). The resulting oily acid and p-nitrophenol (3.5 g) are dissolved in ethyl acetate, and to the solution is added an ethyl acetate solution of N,N'-dicyclohexylcarbodiimide (5.2 g) at 0°C. The mixture is allowed to stand at 4°C overnight. The dicyclohexylurea precipitated is filtered off and the filtrate is evaporated under reduced pressure to give a residue, which is crystallized from ethanol. Recrystallization from ethanol gives the active ester (7.8 g), melting at 96° to 97°C. $[\alpha]_D^{27}-48.3°\pm0.9°$ (c=1.020, methanol).

Anal. Calcd. for $C_{16}H_{22}N_2O_6S$: C, 51.88; H, 5.99; N, 7.56. Found: C, 52.05; H, 5.97; N, 7.68.

j.
t-Butyloxycarbonyl-L-methionyl-γ-benzyl-L-glutamyl-L-histidyl-L-phenylalanyl-L-arginyl-L-tryptophyl-glycine t-Butyloxycarbonyl -γ-benzyl-L-glutamyl-L-histidyl-L-phenylalanyl-L-arginyl-L-tryptophyl-glycine (1.26 g) is dissolved in trifluoroacetic acid (6 ml), and the mixture is kept at room temperature for 30 minutes. After the reaction mixture is chilled in an ice bath, addition of ether affords the partially deblocked hexapeptide as precipitates (1.34 g). The precipitates are dissolved in dimethylformamide (10 ml) and to the solution are added triethylamine (0.46 ml) and t-butyloxycarbonyl-L-methionine p-nitrophenyl ester (0.74 g). The mixture is allowed to stand at 4°C for 24 hours and then introduced into an ice-cold mixture of ethyl acetate-ether (1:4 by volume, 250 ml). The resulting precipitates are filtered off, washed with ether and dried under reduced pressure (yield 1.56 g). This product is suspended in ethanol (15 ml), and the suspension is heated to the boiling point. After cooling, the precipitates are collected by filtration, washed with cold ethanol and ether, and lyophilized from acetic acid to yield 1.16 g of the desired product. $[\alpha]_D^{22} -18.5° \pm 0.5°$ (c=1.072, dimethylformamide).

Anal. Calcd. for $C_{56}H_{73}N_{13}O_{12}S \cdot CH_3COOH \cdot 2H_2O$: C, 54.23; H, 6.67; N, 14.18. Found: C, 54.51; H, 6.16; N, 13.94.

k. Benzyloxycarbonyl-α-aminoisobutyryl-O-benzyl-L-tyrosyl-L-seryl-L-methionyl-γ-benzyl-L-glutamyl-L-histidyl-L-phenylalanyl-L-arginyl-L-tryptophyl-glycine A mixture of benzyloxycarbonyl-α-aminoisobutyryl-O-benzyl-L-tyrosyl-L-serine hydrazide (0.47 g), N hydrochloric acid (2 ml) and dimethylformamide (2 ml) is chilled in an ice bath, and to the solution is added dropwise ice-cold 2M sodium nitrite (0.44 ml). The mixture is stirred at 0°C for 4 minutes and then extracted with ice-cold ethyl acetate. The organic extracts are combined, washed with ice-cold sodium bicarbonate and dried over sodium sulfate. The resulting solution is mixed with a solution of L-methionyl-γ-benzyl-L-glutamyl-L-histidyl-L-phenylalanyl-L-arginyl-L-tryptophyl-glycine trifluoroacetate [prepared quantitatively from 0.4 mmole of t-butyloxycarbonyl derivative (j), by treatment with trifluoroacetic acid (3 ml)] and triethylamine (0.25 ml) in dimethylformamide (10 ml). The mixture is concentrated under reduced pressure at a bath-temperature of 20°C until it becomes clear, and then the solution is kept at 4°C for 24 hours. Most of the solvent is removed by evaporation under reduced pressure at a bath-temperature of 45°C. The precipitates (0.67 g) separated upon addition of ether are reprecipitated from methanol-ethanol-water to yield 0.62 g of the crude peptide. The peptide is submitted to a chromatography on a column of silica gel (merck, 0.05 to 0.2 mm, 150 g) using a solvent system of n-butanol-acetic acid-water=4:1:1 by volume, and 5 ml fractions are collected. The desired product is detected by measuring the absorption at 280 mμ or by thin-layer chromatography in a solvent system of n-butanol-acetic acid-water (4:1:1 by volume). Fractions (tube Nos. 66–90) containing the decapeptide are pooled and concentrated under reduced pressure to give a gelatinous residue, which is lyophilized from acetic acid to yield 0.51 g of the desired product. The product gives a single spot (Rf=0.44, butanol-acetic acid-water =4:1:2 by volume, silica gel thin-layer) on a chromatogram. The hydrochloride of the product has a specific optical rotation of $[\alpha]_D^{22} -24.7° \pm 1.2°$ (c=0.534, dimethylformamide).

Anal. Calcd. for $C_{82}H_{98}N_{16}O_{17}S \cdot 2CH_3COOH \cdot 4H_2O$: C, 57.26; H, 6.37; N, 12.42. Found: C, 57.31; H, 5.82; N, 12.33.

l. α-Aminoisobutyryl-L-tyrosyl-L-seryl-L-methionyl-L-glutamyl-L-histidyl-L-phenylalanyl-L-arginyl-L-tryptophyl-glycyl-L-lysyl-L-prolyl-L-valyl-glycyl-L-lysyl-L-lysyl-L-arginyl-L-arginine amide To a solution of benzyloxycarbonyl-α-aminoisobutyryl-O-benzyl-L-tyrosyl-L-seryl-L-methionyl-γ-benzyl-L-glutamyl-L-histidyl-L-phenylalanyl-L-arginyl-L-tryptophyl-glycine (0.32 g) obtained above in acetic acid is added N hydrogen chloride in acetic acid (0.4 ml) and the mixture is immediately lyophilized. The lyophilized substance is dried over sodium hydroxide pellets under reduced pressure to give the decapeptide hydrochloride, which is dissolved in dimethylformamide (3 ml) together with N-hydroxysuccinimide (0.083 g). To this solution is added a solution of N,N'-dicyclohexylcarbodiimide (0.15 g) in dimethylformamide (2 ml), and the mixture is allowed to stand at 4°C overnight. The dicyclohexylurea separated is collected by filtration, and the filtrate is introduced into ice-cold ethyl acetate (50 ml) and ether (50 ml). The resulting precipitates are collected by filtration, washed with ethyl acetate and ether, and dried under reduced pressure to yield the decapeptide active ester (0.36 g).

The triacetate of N-t-butyloxycarbonyl-L-lysyl-L-prolyl-L-valyl-glycyl-N-t-butyloxycarbonyl-L-lysyl-N-t-butyloxycarbonyl-L-lysyl-L-arginyl-L-arginine amide [prepared quantitatively from 0.12 mmole of the corresponding N-benzyloxycarbonyl derivative by catalytic hydrogenation according to the method described in Bull. Chem. Soc. Japan 39 882 (1966)] is dissolved in dimethylformamide (2 ml) and triethylamine (0.18 ml) is added. The solution is mixed with a dimethylformamide solution of the active ester obtained above, and the mixture (total volume =4ml) is kept at 4°C for 48 hours. The reaction mixtures is then introduced into ice-cold ethyl acetate (100 ml), and the precipitates separated are collected by filtration, washed with ethyl acetate and ether, lyophilized from acetic acid, and dried over sodium hydroxide pellets under reduced pressure to give the protected octadecapeptide (0.56 g).

The protected octadecapeptide obtained above is put into a reaction vessel (made of fluorinated polyethylene) with L-methionine (0.1 g) and anisole (0.5 ml), and hydrogen fluoride is introduced into the vessel placed in a dry ice-acetone bath. The reaction mixture (about 10 ml) is stirred at 0°C for 90 minutes, and evaporated under pressure to give a sirupy residue, which is dissolved in ice-cold water. The solution is washed with ethyl acetate and then passed through a column (1.7 × 12 cm) of Amberlite CG-400 (acetate form). The column is washed with portions of water. The aqueous solutions combined are concentrated to approximately 20 ml under reduced pressure and lyophilized. The crude deblocked peptide thus obtained (0.65 g) is submitted, for purification, to chromatography on a column (2.7 × 27 cm) of carboxymethyl cellulose (Serva Co., 0.56 meq/g) using an ammonium acetate buffer (pH 6.8, 2000 ml) with a linear concentration gradient from 0.02 to 0.6 M. Each fraction (10 ml/tube) is collected and the absorption at 280 mμ is recorded. The fractions corresponding to a main peak (tube Nos. 156–180) and its shoulder (tube Nos. 181–200) are separately collected and the bulk of the solvent is removed by evaporation under reduced pressure at a bath temperature of 50° to 55°C. The residues are lyophilized to constant weight to give 189 mg (F-I) and 76 mg (F-II) of colorless powder from the former fractions and from the latter, respectively. F-I (189 mg) is rechromatographed on a carboxymethyl cellulose column (2.2 × 25 cm) in the same manner as above to give the pure peptide (137 mg, F-I-1) from a single peak. A small shoulder of the peak affords F-I-2

(37 mg). F–II (76 mg) and F–I–2 (37 mg) are combined and the chromatography is repeated twice to obtain 29 mg of the desired peptide. Total yield of the octadecapeptide amide thus obtained amounts to 166 mg. $[\alpha]_D^{23}-58.4°\pm1.9°$ (c=0.514, 0.1N acetic acid). $\gamma_{max}^{0.1N\ HCl}=279$ m$\mu$ ($E_{1cm}^{1\%}=25.1$), $\gamma_{shoulder}^{0.1N\ HCl}=288$ m$\mu$ ($E_{1cm}^{1\%}=19.7$): $\gamma_{max}^{0.1N\ NaOH}=281$ m$\mu$ ($E_{1cm}^{1\%}=25.2$), 288 m$\mu$ ($E_{1cm}^{1\%}=24.4$). The peptide behaves as a single component to ninhydrin, Pauly, Ehrlich, Sakaguchi and methionine (PtI$_6$″) reagents in thin-layer chromatography (solvent system: n-butanol-acetic acid-pyridine-water=30:6:20:24 by volume) and in paper electrophoresis (600 V/36 cm, in 2N acetic acid). Amino acid ratios in acid hydrolysate (6N, HCl, 105°C, 40 hours): serine 0.83, glutamic acid 1.00, proline 1.07, glycine 2,10, α-aminoisobutyric acid 0.99, valine 1.00, methionine 1.02, tyrosine 0.97, phenylalanine 1.04, lysine 3.17, histidine 0.92, arginine 2.90. The tryptophan/tyrosine ratio in the intact octadecapeptide amide was determined spectrophotometrically to be 1.12.

When N-t-butyloxycarbonyl-L-lysyl-L-prolyl-L-valyl-glycyl-N-t-butyloxycarbonyl-L-lysyl-N-t-butyloxycarbonyl-L-lysyl-L-arginyl-L-arginine [prepared according to the method described in Bull. Chem. Soc. Japan 39 822 (1966)] is used as the C-terminal octapeptide in the above reaction, α-aminoisobutyryl-L-tyrosyl-L-seryl-L-methionyl-L-glutamyl-L-histidyl-L-phenylalanyl-L-arginyl-L-tryptophyl-glycyl-L-lysyl-L-prolyl-L-valyl-glycyl-L-lysyl-L-lysyl-L-arginyl-L-argining is similarly obtained.

EXAMPLE 2 a.
N-Benzyloxycarbonyl-N-t-butyloxycarbonyl-L-lysyl-L-prolyl-L-valyl-glycyl-N-t-butyloxycarbonyl-L-orithine methyl ester N-Benzyloxycarbonyl-N-t-butyloxycarbonyl-L-ornithine methyl ester [1.20 g, mp. 69° – 70°C, $[\alpha]_D^{28}-10.6°\pm0.5°$ (c=1.092, methanol)] is hydrogenated over palladium-black catalyst in methanol containing 10% acetic acid for 2 hours. Evaporation of the solvent under reduced pressure gives N-t-butyloxycarbonyl-L-ornithine methyl ester acetate as a sirupy residue, which is treated with 50% aqueous potassium carbonate in dichloromethane at 0°C. The organic layer is dried over sodium sulfate and evaporated under reduced pressure at a bath-temperature of 20°C. The resulting residue is dissolved in dichloromethane (10 ml), and to the solution is added N - benzyloxycarbonyl-N -t-butyloxycarbonyl-L-lysyl-L-prolyl-L-valyl-glycine (1.83 g) prepared according to the method described in Bull. Chem. Soc. Japan 37 1471 (1964). To the solution is added a solution of N,-N'-di-cyclohexylcarbodiimide (0.60 g) in dichloromethane at 0°C and the mixture is allowed to stand at 4°C for 2 days. After removal of the precipitated dicyclohexylurea by filtration, the filtrate is concentrated under reduced pressure to give a sirupy residue. The residue is dissolved in ethyl acetate, washed with ice-cold N hydrochloric acid and M sodium bicarbonate, dried over sodium sulfate and concentrated under reduced pressure. The resulting residue is again dissolved in ethyl acetate (30 ml) and added with ether (30 ml) to give the desired pentapeptide methyl ester in a pure form. Yield 2.24 g; $[\alpha]_D^{26}-55.9°\pm0.9°$ (c=1.062, methanol).

Anal. Calcd. for $C_{42}H_{67}N_7O_{12}$: C, 58.52; H, 7.83; N, 11.37. Found: C, 58.52; H, 8.08; N, 11.33.

b.
N -Benzyloxycarbonyl-N -t-butyloxycarbonyl-L-lysyl-L-prolyl-L-valyl-glycyl-N -t-butyloxycarbonyl-L-ornithine hydrazide The pentapeptide methyl ester (2.2 g) obtained above is dissolved in methanol (30 ml), and hydrazine hydrate (0.26 ml) is added. The reaction mixture is allowed to stand at room temperature for 3 days, and the hydrazide is precipitated by the addition of water. The precipitates are collected by filtration and crystallized from methanol-water to give the desired hydrazide (2.1 g), melting at 175° to 180°C. $[\alpha]_D^{25}-35.8°\pm0.7°$ (c=1.040, dimethylformamide). Anal. calcd. for $C_{41}H_{67}N_9O_{11}$: C, 57.13; H, 7.83; N, 14.62. Found: C, 57.01; H, 7.87; N, 14.41.

c.
N -Benzyloxycarbonyl-N -t-butyloxycarbonyl-L-lysyl-L-prolyl-L-valyl-glycyl-N -t-butyloxycarbonyl-L-ornithyl-N -t-butyloxycarbonyl-L-lysyl-L-arginyl-L-arginine amide diacetate To an ice-cold solution of the pentapeptide hydrazide (0.95 g) obtained above in 90% tetrahydrofuran (10 ml) are added ice-cold N hydrochloric acid (2.75 ml) and 2M sodium nitrite (0.61 ml). The mixture is allowed to stand at 0°C for 5 minutes and adjusted to pH 7.4 to 7.6 by the addition of triethylamine (0.38 ml). To the solution are added an ice-cold solution of N - t-butyloxycarbonyl-L-lysyl-L-arginyl-L-arginine amide triacetate [derived from 0.92 mmole of N - benzyloxycarbonyl-N -t-butyloxycarbonyl-L-lysyl-N$^G$-nitro-L-arginyl-N$^G$-nitro-L-arginine amide by catalytic hydrogenation according to the method described in Bull. Chem. Soc. Japan 39 882 (1966)] and triethylamine (0.42 ml) in 80% tetrahydrofuran (7.5 ml). The mixture is allowed to stand at 4°C for 3 days and concentrated under reduced pressure. The resulting residue is added with ethyl acetate (10 ml) and N acetic acid (10 ml), and the mixture is shaken well. The aqueous phase is extracted three times with ethyl acetate, and the combined extracts are concentrated under reduced pressure to approximately 10 ml. The concentrate is mixed with N acetic acid, and the mixture is well shaken. The concentrate is thoroughly extracted with water-saturated n-butanol. The extract is dried over sodium sulfate and concentrated under reduced pressure. The resulting residue is lyophilized from acetic acid to give the desired product (0.85 g). $[\alpha]_D^{22}-43.1°\pm1.5°$ (c=0.540, 50% acetic acid).

Anal. Calcd. for $C_{64}H_{110}N_{18}O_{16}\cdot2CH_3COOH\cdot4H_2O$: C, 51.70; H, 8.04; N, 15.96; $CH_3CO$, 5.11. Found: C, 51.60; H, 7.72; N, 15.62; $CH_3CO$, 4.30.

d.
α-Aminoisobutyryl-L-tyrosyl-L-seryl-L-methionyl-L-glutamyl-L-histidyl-L-phenylalanyl-L-arginyl-L-tryptophyl-glycyl-L-lysyl-L-prolyl-L-valyl-glycyl-L-ornithyl-L-lysyl-L-arginyl-L-arginine amide The decapeptide derivative (0.32 g) obtained in Example 1(k) is converted into the corresponding N-hydroxy-succinimide ester in a conventional manner. The active ester (0.32 g) thus obtained is added to a solution of an octapeptide (derived from 0.19 g of the octapeptide derivative obtained in Example 2(c) by catalytic hydrogenation) and triethylamine (0.18 ml) in dimethylformamide (4 ml). The reaction mixture is kept at 4°C for 64 hours and then added dropwise into ice-cold ethyl acetate (100 ml). The precipitates formed are collected by filtration, washed with ethyl acetate and ether, and dried under reduced pressure to give a crude protected octadecapeptide (0.49 g).

The crude product (0.29 g) is dissolved in liquid hydrogen fluoride (5–6 ml) together with methionine (0.06 g) and anisole (0.29 ml) at a dry ice-acetone bath temperature, and the mixture is stirred at 0°C for 90 minutes, after which hydrogen fluoride is removed by evaporation under reduced pressure. The residue is dissolved in ice-cold water, and the solution is washed twice with ethyl acetate. The resulting aqueous solution is passed through a column (1.7 × 20 cm) of Amberlite CG-400 (acetate form) and the column is washed with portions of water. The effluents are combined, concentrated under reduced pressure and lyophilized to afford a crude deblocked octadecapeptide (0.34 g).

The crude octadecapeptide (0.34 g) is submitted for purification to chromatography on a column (1.7 × 36 cm) of carboxymethyl cellulose (Serva, 0.56 meq/g) using an ammonium acetate buffer (pH 6.8) with a linear concentration gradient of 0.02 to 0.6M (1500 ml). Fractions (7.5 ml/tube) are collected and the absorption at 280 m$\mu$ is recorded. The tubes corresponding to a main peak are pooled in two separate fractions F–I (tubes 106–130) and F–II (tubes 131–155). The bulk of the solvent is removed by evaporation under reduced pressure and the residue is lyophilized repeatedly to constant weight. F–I and F–II are thus amounted to 76 mg and 84 mg, respectively. F–II (84 mg) is rechromatographed on a carboxymethyl cellulose column in the same manner as above to give F–II–1 (30 mg). F–I and F–II–1 are combined to afford a partially purified desired octadecapeptide (106 mg). For further purification a 65 mg-portion of this product is again submitted to chromatography on a column (1.7 × 30 cm) of carboxymethyl cellulose (Whatman CM-52) using an ammonium acetate buffer (pH 6.9) with a linear concentration gradient of 0.02 to 0.6M (1500 ml). The tubes corresponding to a single peak are combined, evaporated and lyophilized to give the pure octadecapeptide, i.e. α-aminoisobutyryl-L-tyrosyl-L-seryl-L-methionyl-L-glutamyl-L-histidyl-L-phenylalanyl-L-arginyl-L-tryptophyl-glycyl-L-lysyl-L-prolyl-L-valyl-glycyl-L-ornithyl-L-lysyl-L-arginyl-L-arginine amide acetate (52 mg). $[\alpha]_D^{25}-57.3°\pm1.9°$ (c=0.499, 0.1N acetic acid). $\gamma_{max}^{0.1N\ HCl}=279$ m$\mu$ (E$^{1\%}_{1cm}$ 24.0), $\gamma_{shoulder}^{0.1N\ HCl}=288$ m$\mu$ E$_{1cm}^{1\%}$ 17.8); $\gamma_{max}^{0.1N\ NaOH}=281$ m$\mu$ (E$_{1cm}^{1\%}$ 24.6), 288 m$\mu$ (E$_{1cm}^{1\%}$ 23.8). Amino acid ratios in acid hydrolysate (6N hydrochloric acid, 105°C, 40 hours): serine 0.80, glutamic acid 0.99, proline 1.04, glycine 2.03, α-aminoisobutyric acid 0.95, valine 1.00, methionine 1.03, tyrosine 1.04, phenylalanine 1.05, ornithine 1.08, lysine 2.00, histidine 1.01, arginine 3.12. The tryptophan/tyrosine ratio in the intact octadecapeptide was determined spectrophotometrically to be 1.19. The peptide behaves as a single component in thin-layer chromatography (n-butanol-acetic acid-pyridine-water=30:6:20:24 by volume) and in paper electrophoresis (600 V/36 cm, in 2N acetic acid).

EXAMPLE 3 a. Benzyloxycarbonyl-L-alanyl-glycine t-butyl ester

Benzyloxycarbonyl-L-alanine (6.70 g) and glycine t-butyl ester (3.95 g) are dissolved in ethyl acetate (30 ml), and to the solution is added a solution of N,N'-dicyclohexylcarbodiimide (6.20 g) in ethyl acetate at 0°C. The mixture is allowed to stand overnight at 40°C, and the dicyclohexylurea precipitated is removed by filtration. The filtrate is washed with ice-cold N hydrochloric acid and M sodium bicarbonate, dried over sodium sulfate and evaporated under reduced pressure to give a residue, which is crystallized from ether and petroleum ether to yield 7.84 g of the desired product, melting at 41 to 42°C. $[\alpha]_D^{26}-41.6\pm0.8°$ (c=1.026, methanol).

Anal. Calcd. for $C_{17}H_{24}N_2O_5$: C, 60.70; H, 7.19; N, 8.33. Found: C, 60.39; H, 7.42; N, 8.25.

b. Benzyloxycarbonyl-β-t-butyl-L-aspartyl-L-alanyl-glycine t-butyl ester

The dipeptide (6.73 g) obtained above is hydrogenated over palladium as a catalyst in 10% acetic acid-methanol for 2 hours. After removal of the solvent by evaporation under reduced pressure, the resulting residue is shaken with potassium carbonate solution in the presence of dichloromethane. The organic phase is dried over sodium sulfate and concentrated under reduced pressure to give L-alanyl-glycine t-butyl ester as an oil.

Benzyloxycarbonyl-β-t-butyl-L-aspartic acid (prepared by treating the corresponding dicyclohexylamine salt (10.1 g) with Dowex 50W × 8 (H$^+$ form) in the usual manner) and the dipeptide ester obtained above are dissolved in dichloromethane, and to the solution is added a solution of dicyclohexylcarbodiimide (4.13 g) in dichloromethane at 0°C. The mixture is allowed to stand at 4°C overnight. After removal of the resulting dicyclohexylurea by filtration, the filtrate is concentrated under reduced pressure. The resulting residue is dissolved in ethyl acetate, washed with ice-cold N hydrochloric acid and M sodium carbonate, dried over anhydrous sodium sulfate and concentrated under reduced pressure to give an oil, which is crystallized from ether-petroleum ether. Recrystallization from the same solvent gives the pure tripeptide derivative (7.05 g), melting at 111° to 112°C. $[\alpha]_D^{27}-29.4\pm0.7°$ (c=1.033, methanol).

Anal. Calcd. for $C_{25}H_{37}N_3O_8$: C 59.16; H, 7.35; N, 8.28. Found: C, 59.22; H, 7.38; N, 8.24.

c. Benzyloxycarbonyl-L-prolyl-β-t-butyl-L-aspartyl-L-alanyl-glycine t-butyl ester The tripeptide ester (6.10 g) obtained above is hydrogenated over palladium-black as a catalyst in 5% acetic acid-methanol for 5 hours. After removal of the catalyst, the filtrate is concentrated under reduced pressure to give an oily residue, which is shaken with potassium carbonate solution in the presence of dichloromethane at 0°C. The organic solutions are combined and concentrated under reduced pressure to give β-t-butyl-L-aspartyl-L-alanyl-glycine t-butyl ester.

Benzyloxycarbonyl-L-proline (2.90 g) and the tripeptide ester obtained above are dissolved in dichloromethane (50 ml), and to the solution is added a solution of dicyclohexylcarbodiimide (2.48 g) in dichloromethane at 0°C. The mixture is stirred at 0°C for 30 minutes and allowed to stand overnight at 4°C. The dicyclohexylurea precipitated is removed by filtration and the filtrate is concentrated under reduced pressure to give a residue, which is treated with ether for crystallization. The crystals (6.45 g) is dissolved in acetonitrile, and a small amount of insoluble dicyclohexylurea is removed. After removal of the solvent, the resulting residue is crystallized from ether. Yield 6.00 g, mp. 148°–150°C, $[\alpha]_D^{27}$ –66.0±1.0° (c=1.036, methanol).

Anal. Calcd. for $C_{30}H_{44}N_4O_9$: C, 59.59; H, 7.33; N, 9.27. Found: C, 59.69; H, 7.46; N, 9.12.

d.
N,O-Dibenzyloxycarbonyl-L-tyrosyl-L-prolyl-β-t-butyl-L-aspartyl-L-alanyl-glycine t-butyl ester The tetrapeptide ester (5.00 g) obtained above is hydrogenated over palladium-black as a catalyst in methanol containing 1 ml of acetic acid for 4 hours. After removal of the catalyst by filtration, the filtrate is concentrated under reduced pressure to give a residue, which is shaken with 50% potassium carbonate in the presence of dichloromethane at 0°C. The organic solution are combined, dried over sodium sulfate and concentrated to give L-prolyl-β-t-butyl-L-aspartyl-L-alanyl-glycine t-butyl ester. The product gives a single spot on thin-layer chromatography (silica gel) in the solvent system of n-butanol-acetic acid-pyridine-water=30:6:20:24 by volume.

Carbodiimide method

N,O-Dibenzyloxycarbonyl-L-tyrosine (0.45 g, 1 mmole) and the tetrapeptide ester (1 mmole) obtained above are dissolved in dichloromethane (10 ml), and to the solution is added a solution of dicyclohexylcarbodiimide (0.206 g) in dichloromethane. The mixture is allowed to stand at 4°C overnight, and the resulting precipitates are removed by filtration. The filtrate is concentrated under reduced pressure to give a residue, which is added with ether to yield the crystals. Recrystallization from ethyl acetate and ether gives the desired peptide, melting at 121° to 123°C. Yield 0.51 g.

The product behaves as a single spot on thin-layer chromatography (silica gel) in the solvent system of chloroformmethanol-acetic acid=90:10:3 by volume.

Active ester method

L-Prolyl-β-t-butyl-L-aspartyl-L-alanyl-glycine t-butyl ester (5.77 mmole) is dissolved in dimethylformamide (30 ml), and to the solution is added N,O-dibenzyloxycarbonyl-L-tyrosine p-nitrophenyl ester (3.63 g). The mixture is allowed to stand at 4°C for 3 days. After removal of the solvent by evaporation under reduced pressure, the resulting residue is crystallized from ethyl acetate and ether. Recrystallization from ethyl acetate gives 6.65 g of the desired product, melting at 126° to 127°C. $[\alpha]_D^{28}$ –48.3±1.0° (c=0.86, methanol).

Anal. Calcd. for $C_{47}H_{59}N_5O_{13}$: C, 62.58; H, 6.59; N, 7.76. Found: C, 62.44; H, 6.56; N, 7.52.

e.
Benzyloxycarbonyl-L-valyl-L-tyrosyl-L-prolyl-β-t-butyl-L-aspartyl-L-alanyl-glycine t-butyl ester The pentapeptide ester (6.60 g) obtained above is hydrogenated over palladium as a catalyst in methanol containing 10% acetic acid for 4 hours. After removal of the solvent by evaporation under reduced pressure, the resulting residue is dissolved in dichloromethane. The solution is shaken with 50% potassium carbonate at 0°C. The organic solution is dried over magnesium sulfate and concentrated under reduced pressure to give the crystalline pentapeptide diester. The product is dissolved in dimethylformamide (50 ml), and benzyloxycarbonyl-L-valaine p-nitrophenyl ester (2.72 g) is added to the solution. The mixture is reacted at 4°C for 2 days and concentrated under reduced pressure at a bath-temperature of 40° to 45°C to give the crude product. The crude product is chromatographed on a column of silica gel (Merck, 0.05 to 0.2 mm mesh, 150 g). The column is developed with methanol-chloroform having a linear methanol concentration gradient of 0 to 5% to give 56 fractions (20 g/tube). Subsequently, the column is washed with methanol-chloroform (5:95, v/v). Each fraction is checked by thin-layer chromatography and fractions (tube Nos. 55–60) are combined. The solution is concentrated under reduced pressure, and the residue is added with ether to give 5.25 g of the desired product. $[\alpha]_D^{26}$ –70.5±1.1° (c=1.031, methanol).

Anal. Calcd. for $C_{44}H_{62}N_6O_{12} \cdot H_2O$: C, 59.71; H, 7.29; N, 9.50. Found: C, 59.65; H, 7.19; N, 9.30.

f.
N -Benzyloxycarbonyl-N -t-butyloxycarbonyl-L-lysyl-L-valyl-L-tyrosyl-L-prolyl-β-t-butyl-L-aspartyl-L-alanyl-glycine t-butyl ester The hexapeptide ester (4.62 g) is hydrogenated over palladium as a catalyst in 10% acetic acid-methanol for 4 hours. After removal of the solvent by evaporation under reduced pressure, the resulting residue is dissolved in ethyl acetate. The solution is chilled with ice and shaken with 50% potassium carbonate. The organic solution is dried over sodium sulfate and concentrated under reduced pressure to give the hexapeptide diester. The peptide is dissolved in dimethylformamide (40 ml), and to the solution is added N -benzyloxycarbonyl-N -t-butyloxycarbonyl-L-lysine p-nitrophenyl ester (2.56 g). The mixture is allowed to stand at 4°C for 3 days and concentrated under reduced pressure at a bath-temperature of 40° to 45°C. The resulting residue is chromatographed on a column of silica gel (Merck, 0.05–0.2 mm mesh, 150 g). The column is washed with methanol-chloroform having a linear methanol concentration gradient to collect 50 tubes (20 g/tube). Subsequently, methanol-chloroform (5:95, v/v) is used for further development. Fractions (tube Nos. 71–80) are combined and evaporated under reduced pressure to give a residue, which is treated with ether to yield a gelatinous mass. The product is washed with ether and dried to give 4.38 g of the desired product. $[\alpha]_D^{25}$ –64.5°±1.0° (c=1.037, methanol).

Anal. Calcd. for $C_{55}H_{82}N_8O_{15} \cdot H_2O$: C, 59.34; H, 7.61; N, 10.07. Found: C, 60.05; H, 7.67; N, 10.06.

g.
Benzyloxycarbonyl-L-valyl-N -t-butyloxycarbonyl-L-lysyl-L-valyl-L-tyrosyl-L-prolyl-β-t-butyl-L-aspartyl-L-alanyl-glycine t-butyl ester The heptapeptide ester (3.5 g) obtained above is hydrogenated over palladium-black as a catalyst in 10% acetic acid-methanol for 3 hours. After removal of the solvent by evaporation under reduced pressure, the resulting residue is dissolved in ethyl acetate. The solution is shaken with 50% potassium carbonate at 0°C. Then, the organic solution is dried over sodium sulfate and concentrated under reduced pressure to give a residue, which is dissolved in dimethylformamide (30 ml). The solution is added with benzyloxycarbonyl-L-valine p-nitrophenyl ester (1.29 g). The mixture is allowed to stand at 4°C for 2 days and concentrated under reduced pressure at a bath-temperature of 40° to 45°to give a residue. The residue is submitted to chromatography on a column of silica gel (Merck, 0.05 to 0.2 mm mesh, 100 g), and the column is washed with chloroform-methanol having a linear methanol concentration gradient of 0 to 5% by volume to collect 50 fractions (20 g/tube). The column is further developed with methanol-chloroform (5:95, v/v). Fractions (tube Nos. 52–62) containing the desired peptide are pooled and concentrated under reduced pressure to give a residue. The residue is treated with ether, washed and dried to give 3.35 g of the desired peptide. $[\alpha]_D^{25}$ −69.2°±1.0° (c=1.061, methanol).

Anal. Calcd. for $C_{60}H_{91}N_9O_{16}$: C, 60.34; H, 7.68; N, 10.55. Found: C, 60.30; H, 7.84; N, 10.28.

h.
N -Benzyloxycarbonyl-$N^G$-nitro-L-arginyl-L-proline methyl ester

To a mixture of thionyl chloride (1.6 ml) and methanol (2.0 ml) cooled in an ice-salt bath is added L-proline (2.30 g), and the mixture is allowed to stand at room temperature overnight. After removal of the solvent by evaporation under reduced pressure the resulting residue is dissolved in dichloromethane. The solution is added with water (2 ml) and shaken with ice-cold 50% potassium carbonate (4 ml) at 0°C. The aqueous solution is extracted repeatedly with dichloromethane and the extracts are combined. The extract is dried over sodium sulfate and concentrated under reduced pressure at a bath-temperature of 20°C to give L-proline methyl ester as a sirupy residue.

N -Benzyloxycarbonyl-$N^G$-nitro-L-arginine (6.18 g) is dissolved in methanol, and the solution is concentrated under reduced pressure to give a sirupy residue, which is dissolved in acetonitrile. To the solution is added L-proline methyl ester obtained above, and dicyclohexylcarbodiimide (3.61 g) is added to the solution at 0°C. The mixture is allowed to stand at 4°C overnight. The crystalline precipitates are collected by filtration, washed with cold acetonitrile and dried under reduced pressure. The resulting product (9.98 g) is dissolved in hot methanol, and insoluble dicyclohexylurea is removed by filtration. The filtrate is concentrated under reduced pressure to give a residue, which is recrystallized from acetonitrile to give 5.75 g of the desired product, melting at 162° to 163°C. $[\alpha]_D^{22}$ −50.9°±0.4° (c=2.022, methanol).

Anal. Calcd. for $C_{20}H_{28}N_6O_7$: C, 51.72; H, 6.08; N, 18.09. Found: C, 51.63; H, 6.14; N, 17.92.

i.
N -Benzyloxycarbonyl-$N^G$-nitro-L-arginyl-$N^G$-nitro-L-arginyl-L-proline methyl ester The dipeptide ester (4.12 g) obtained above is dissolved in acetic acid saturated with hydrogen bromide (10 ml). The solution is allowed to stand at room temperature for 60 minutes. Amorphous precipitates separated upon addition of ether are collected by filtration, washed well with ether and dried over sodium hydroxide pellets under reduced pressure to give $N^G$-nitro-L-arginyl-L-proline methyl ester hydrobromide.

N -Benzyloxycarbonyl-$N^G$-nitro-L-arginine (2.83 g) is dissolved in anhydrous tetrahydrofuran (2.5 ml), and tri-n-butylamine (1.63 g) is added. The solution is cooled in an ice-salt bath, and to the solution is added dropwise ethyl chloroformate (0.96 g). The mixture is stirred for 30 minutes in an ice-salt bath, and to the mixture is added a solution of the dipeptide ester hydrobromide (2.96 g) obtained above and tri-n-butylamine in dioxane (40 ml) containing water (1 ml).

The reaction mixture is stirred at 0°C for 3 hours and allowed to stand at 4°C overnight. After removal of the solvent by evaporation under reduced pressure, the resulting residue is dissolved in 10% n-butanol-ethyl acetate. The solution is washed with N hydrochloric acid and M sodium carbonate, dried over sodium sulfate and concentrated under reduced pressure to give a residue. The residue is dissolved in methanol-chloroform (5:95, v/v, 30 ml) and the solution is submitted to chromatography on a column of silica gel (Merck, 0.05–0.2 mm mesh, 60 g). The column is washed successively with chloroform (600 ml), methanol-chloroform (5:95, v/v, 200 ml), methanol-chloroform (7:93, v/v, 1000 ml), methanol-chloroform (10:90, v/v, 400 ml) and methanol-chloroform (1:1, v/v, 400 ml) to elute the desired peptide. Each fraction is checked by thin-layer chromatography, and the fractions containing the desired peptide are combined. The solution is concentrated under reduced pressure to give a residue, which is treated with ethyl acetate to give gelatinous precipitates. The precipitates are collected by filtration, washed with ethyl acetate and dried under reduced pressure to yield 3.8 g of the desired peptide, melting at 115° to 120°C with decomposition. $[\alpha]_D^{27}$ −37.1°±0.8° (c=0.967, acetic acid), −30.5°±0.7° (c=0.950, dimethylformamide).

Anal. Calcd. for $C_{26}H_{39}N_{11}O_{10} \cdot H_2O$: C, 45.68; H, 6.05; N, 22.54. Found: C, 45.52; H, 5.92; N, 22.85.

j.
N -Benzyloxycarbonyl-N -t-butyloxycarbonyl-L-lysyl-$N^G$-nitro-L-arginyl-$N^G$-nitro-L-arginyl-L-proline methyl ester The tripeptide ester (3.7 g) obtained above is dissolved in acetic acid (10 ml) saturated with hydrogen bromide, and the solution is allowed to stand at room temperature for 90 minutes. Anhydrous ether is added to the solution to precipitate the tripeptide ester hydrobromide. The precipitates are recrystalized from methanol-ether to give 4.6 g of amorphous solid. The product shows a major spot (Rf 0.64) and minor spots (Rf 0.44, 0.52) on paper chromatography in the solvent system of n-butanolacetic acid-pyridine-water=30:6:20:24 by volume.

N -Benzyloxycarbonyl-N -t-butyloxycarbonyl-L-lysine [prepared from the corresponding dicyclohexylamine salt (3.05 g) by the treatment with Dowex 50W × 8 (H⁺ form)] and tri-n-butylamine (1.11 g) are dissolved in anhydrous tetrahydrofuran (20 ml), and the solution is cooled in an ice-salt bath. To the solution is added ethyl chloroformate (0.65 g), and the mixture is stirred in an ice-salt bath for 30 minutes. To the mixture is added a solution of the tripeptide ester obtained above and tri-n-butylamine (2.0 g) in dioxane (30 ml) containing water (3 ml), and the resulting mixture is stirred at 0°C for 3 hours. After allowing the mixture to stand at 4°C overnight, it is concentrated under reduced pressure to give a residue, which is dissolved in ethyl acetate containing 10% n-butanol. The solution is washed successively with ice-cold N hydrochloric acid and M sodium carbonate, and dried over sodium sulfate. The solution is concentrated under reduced pressure to give a residue, which is twice reprecipitated from ethyl acetate-ether to yield 3.82 g of the desired product. $[\alpha]_D^{29} -37.9° \pm 0.7°$ (c=1.064, methanol).

k.

N -Benzyloxycarbonyl-N -t-butyloxycarbonyl-L-lysyl-$N^G$-nitro-L-arginyl-$N^G$-nitro-L-arginyl-L-proline The tetrapeptide ester (3.8 g) obtained above is dissolved in methanol (10 ml), and to the solution is added N sodium hydroxide (5.1 ml). The mixture is reacted at room temperature for 90 minutes and acidified with N hydrochloric acid (5.1 ml). After removal of the methanol by evaporation under reduced pressure, the resulting oily residue is extracted with 10% n-butanol-ethyl acetate. The extracts are concentrated under reduced pressure to give a residue, which is recrystallized from methanol-ether to give 2.6 g of the desired product. $[\alpha]_D^{23} -36.7° \pm 0.8°$ (c=0.977, methanol).

Anal. Calcd. for $C_{36}H_{57}N_{13}O_{13} \cdot 2H_2O$: C, 47.21; H, 6.67; N, 19.89. Found: C, 47.64; H, 6.43; N, 19.28.

l.

N -Benzyloxycarbonyl-N -t-butyloxycarbonyl-L-lysyl-
$N^G$-nitro-L-arginyl-$N^G$-nitro-L-arginyl-L-prolyl-L-valyl-
N -t-butyloxycarbonyl-L-lysyl-L-valyl-L-tyrosyl-L-prolyl-$\beta$-t-butyl-L-aspartyl-L-alanyl-glycine t-butyl ester The tripeptide (1.19 g) obtained above is dissolved in methanol (1.5 ml), and to the solution is added acetic acid (1 ml). The solution is hydrogenated over palladium-black as a catalyst under a hydrogen stream for 4 hours. After removal of the solvent by evaporation under reduced pressure, the resulting residue is dissolved in ethyl acetate. The solution is cooled and shaken with cold 50% potassium carbonate. The organic phase is dried over sodium sulfate and concentrated under reduced pressure to give the octapeptide diester. The octapeptide diester is dissolved in dimethylformamide (30 ml), and to the solution is added a solution of N -benzyloxycarbonyl-N -t-butyloxycarbonyl-L-lysyl-$N^G$-nitro-L-arginyl-$N^G$-nitro-L-arginyl-L-proline (1.32 g), N-hydroxysuccinimide (0.173 g) and dicyclohexylcarbodiimide (0.310 g) in dimethylformamide. The mixture is allowed to stand at 4°C for 2 days and the dicyclohexyl-urea separated is removed by filtration. The filtrate is concentrated under reduced pressure at a bath-temperature of 40 to 45°C to give a residue, which is submitted for purification to chromatography on a column of silica gel (Merck, 0.05 to 0.2 mm mesh, 40 g). The column which has previously prepared with methanol-chloroform (2:98, v/v) is developed with the same solvent to collect 50 fractions (10 ml/tube), and the column is further developed with methanol-chloroform (15:85, v/v). Fractions (tube Nos. 34–66) are combined and concentrated under reduced pressure to give a residue, which is dissolved in ethyl acetate and treated with methanol-ethyl acetate to precipitate the desired product (yield 1.73 g). $[\alpha]_D^{22} -78.5° \pm 1.1°$ (c=1.030, methanol).

Anal. Calcd. for $C_{88}H_{140}N_{22}O_{26} \cdot H_2O$: C, 54.48; H, 7.38; N, 15.88. Found: C, 54.14; H, 7.53; N, 15.88.

m.

N -t-Butyloxycarbonyl-L-lysyl-L-arginyl-L-arginyl-
-prolyl-L-valyl-N -t-butyloxycarbonyl-L-lysyl-L-valyl-
L-tyrosyl-L-prolyl-$\beta$-t-butyl-L-aspartyl-L-alanyl-glycine t-butyl ester The dodecapeptide ester (577 mg) obtained above is hydrogenated over palladium as a catalyst in 90% acetic acid (15 ml) overnight. After removal of the solvent by evaporation under reduced pressure, the residue is lyophilized from water and dried over sodium hydroxide pellets under reduced pressure to give 570 mg of the desired product.

Amino acid ratio in acid hydrolysate: aspartic acid 1.19, proline 2.29, glycine 1.00, alanine 0.99, valine 2.15, tyrosine 0.91, lysine 2.11, arginine 1.96.

Anal. Calcd. for $C_{80}H_{136}N_{20}O_{20} \cdot 2CH_3COOH \cdot 4H_2O$: C, 53.37; H, 8.11; N, 14.82; $CH_3CO$, 4.55. Found: C, 53.07; H, 7.57; N, 14.82; $CH_3CO$, 4.57.

n.

N -t-Butyloxycarbonyl-L-lysyl-L-prolyl-L-valyl-glycyl-
N -t-butyloxycarbonyl-L-lysyl-N -t-butyloxycarbonyl-L-lysyl-L-arginyl-L-arginyl-L-prolyl-L-valyl-N -t-butyl-
oxycarbonyl-L-lysyl-L-valyl-L-tyrosyl-L-prolyl-$\beta$-t-butyl-L-aspartyl-L-alanyl-glycine t-butyl ester N -Benzyloxycarbonyl-N -t-butyloxycarbonyl-L-lysyl-L-prolyl-L-valyl-glycol-N -t-butyloxycarbonyl-L-lysine hydrazide (0.492 g) [prepared according to the method described in Bull. Chem. Soc. Japan 37 1471 (1964)] is dissolved in dimethylformamide (4 ml) and the solution is cooled with ice. To the solution are added ice-cold N hydrochloric acid (1.375 ml) and 2M sodium nitrite (0.303 ml), and the mixture is shaken at 0°C for 4 minutes. The resulting azide is extracted with ice-cold ethyl acetate, and the extracts are combined. The extract is washed with cold saturated sodium bicarbonate solution and dried over sodium sulfate. The thus obtained azide is added to a solution of the dodecapeptide (0.275 mmole) obtained above and triethylamine (0.127 ml) in aqueous dimethylformamide (4 ml) containing water (0.2 ml). The reaction mixture is concentrated under reduced pressure at a bath-temperature of 10°C to 15°C until the mixture becomes clear. The solution is allowed to stand at 4°C for 24 hours and to the solution is added the pentapeptide azide (prepared from 0.138 mmole of the corresponding hydrazide by the method as described above). The mixture is allowed to stand at the same temperature overnight, and the solvent is removed by evaporation under reduced pressure to give a residue, which is precipitated upon addition of ether. The precipitates are dissolved in n-butanol-ethyl acetate (1:2, v/v) and the solution is washed with N acetic acid. The organic solution is dried over sodium sulfate and lyophilized from acetic acid to give the heptadecapeptide ester (1.12 g).

The peptide obtained above is hydrogenated over palladium as a catalyst in methanol in the presence of acetic acid for 90 minutes. After removal of the solvent by evaporation under reduced pressure, the resulting residue is lyophilized from acetic acid (yield 1.007 g).

A portion (0.37 g) of lyophilysate is submitted for purification to gel fitration on a column (2.3 × 143 cm) of Sephadex G–25 using 20% acetic acid. Each 5 ml fraction is pooled and the absorption at 275 mμ is recorded. Fractions (tube Nos. 32–45) containing the desired peptide are pooled, concentrated and lyophilized from acetic acid to give 0.21 g of the heptadecapeptide ester. $[\alpha]_D^{23}$ –74.2°±1.6° (c=0.667, 50% acetic acid).

o.
α-Aminoisobutyryl-L-tyrosyl-L-seryl-L-methionyl-L-glutamyl-L-histidyl-L-phenylalanyl-L-arginyl-L-tryptophylglycyl-L-lysyl-L-prolyl-L-valyl-glycyl-L-lysyl-L-lysyl-L-arginyl-L-arginyl-L-prolyl-L-valyl-L-lysyl-L-valyl-L-tyrosyl-L-prolyl-L-aspartyl-L-alanyl-glycine To a solution of benzyloxycarbonyl-α-aminoisobutyryl-O-benzyl-L-tyrosyl-L-seryl-L-methionyl-γ-benzyl-L-glutamyl-L-histidyl-L-phenylalanyl-L-arginyl-L-tryptophyl-glycine (0.32 g) [prepared according to the method described in Example 1(k)] in acetic acid is added N hydrogen chloride in acetic acid (0.45 ml), and the mixture is immediately lyophilized, followed by drying under reduced pressure over sodium hydroxide pellets. The resulting decapeptide hydrochloride is dissolved in dimethylformamide (3 ml) together with N-hydroxysuccinimide (0.083 g), and to the solution is added a solution of dicyclohexylcarbodiimide (0.15 g) in dimethylformamide (2ml). The mixture is allowed to stand at 4°C for 24 hours and the dicyclohexylurea precipitated is removed by filtration. The filtrate is poured into ice-cold ethyl acetate-ether (1:1, v/v, 100 ml), and the precipitates which formed are collected by filtration. The precipitates are washed with ethyl acetate and ether and dried under reduced pressure to give the decapeptide active ester.

The heptadecapeptide ester acetate (0.300 g) obtained above is dissolved in dimethylformamide (3ml), and triethylamine (0.17 ml) is added. The solution is mixed with a solution of the decapeptide ester obtained above in dimethylformamide, and the mixture (total volume: 5 ml) is stirred at 4°C for 3 days. The reaction mixture is introduced into ice-cold ethyl acetate (50 ml), and ether (50 ml) is added. The precipitates formed are collected by filtration, washed with ether and dried under reduced pressure to give the crude protected heptacosapeptide (0.60 g).

The protected heptacosapeptide obtained above is placed in a reaction vessel made of fluorinated polyethylene, together with methionine (0.1 g) and anisole (0.6 ml), and hydrogen fluoride is introduced into the reaction vessel in a dry ice-acetone bath. The reaction mixture (about 20 ml) is stirred at room temperature for 40 minutes and concentrated under reduced pressure to give a residue, which is dissolved in ice-water. The solution is washed with chloroform and passed through a column (1.4 × 30 cm) of Amberlite CG–4B (acetate form). The column is washed well with portions of water and the aqueous solution eluted are combined. The solution is concentrated under reduced pressure and lyophilized. The resulting peptide (0.41 g) is submitted for purification to chromatography on a column (2.2 × 30 cm) of carboxymethyl cellulose (Serva, 0.56 meq/g) with an ammonium acetate buffer (pH 6.5, 2000 ml) having a linear concentration gradient from 0.02 to 0.6 M. The absorption at 280 mμ is recorded and fractions (10 ml/tube) are pooled. The fractions F–I (tube Nos. 91–104) and F–II (tube Nos. 105–130) corresponding to a main peak are collected separately. The bulk of the solvent is removed by evaporation and the residue is lyophilized repeatedly to constant weight. F–I and F–II amount to 100 mg and 180 mg of the deblocked heptacosapeptide, respectively. F–II is rechromatographed on a carboxymethyl cellulose in the same manner as above to give F–II–1 (80 mg) and F–II–2 (85 mg) as the first half and the rest of main peak, respectively. F–I and F–II–1 are combined (180 mg) and rechromatographed again to afford the desired peptide being fairly pure as judged from thin-layer chromatography on a cellulose plate in a solvent system of n-butanol-acetic acid-pyridine-water=30:6:20:24 by volume. A 147 mg-portion of the product obtained above is submitted to chromatography on a column (2.0 × 30 cm) of carboxymethyl cellulose (Whatman CM-52) using an ammonium acetate buffer (pH 6.5, 2000 ml) with a linear concentration gradient of 0.02 to 0.5 M. The fractions corresponding to a single peak are combined, evaporated and lyophilized to give the pure heptacosapeptide. Yield 100 mg. $[\alpha]_D^{24}$ –89.2°±2.5° (c=0.53, 0.1N acetic acid), $\gamma_{max}^{0.1N\ HCl}$ 276 mμ ($E_{1cm}^{1\%}$ 22.0), 288 mμ ($E_{1cm}^{1\%}$ 15.8), $\gamma_{max}^{0.1N-NaOH}$ 282 mμ ($E_{1cm}^{1\%}$ 23.0), 288 mμ ($E_{1cm}^{1\%}$ 23.8).

Amino acid ratio in acid hydrolysate: aspartic acid 0.99, serine 0.89, glutamic acid 1.00, proline 3.93, glycine 3.00, alanine 1.02, valine 2.80, methionine 1.01, tryosine 1.90, phenylalanine 0.99, α-aminoisobutyric acid 1.19, lysine 4.52, histidine 1.22, arginine 2.91. The tryptophan/tyrosine ratio in the intact heptacosapeptide was determined spectrophotometrically to be 0.54.

EXAMPLE 4 a. Benzyloxycarbonyl-L-valyl-L-tyrosine methyl ester

Benzyloxycarbonyl-L-valine (5.78 g) and L-tyrosine methyl ester (4.49 g) are dissolved in dimethylformamide (10 ml) and to this solution is added dicyclohexylcarbodiimide (4.75 g) with dichloromethane (50 ml) at 0°C. The mixture is kept at 4°C overnight. The dicyclohexylurea which has separated is removed by filtration and the filtrate is evaporated under reduced pressure. The residue is dissolved in ethyl acetate and the solution is washed with N hydrochloric acid and M sodium bicarbonate, and dried over magnesium sulfate. Evaporation of the solvent gives a crystalline residue which is recrystallized from ethyl acetate-ether; yield 8.47 g, mp 154° – 155°C, $[\alpha]_D^{22}$ –18.3°±0.6° (c=0.98, methanol).

Anal. Calcd. for $C_{23}H_{28}N_2O_6$: C, 64,47; H, 6.59; N, 6.54. Found: C, 64.58; H, 6.62; N, 6.58.

b. Benzyloxycarbonyl-L-valyl-L-tyrosine hydrazide

To a solution of benzyloxycarbonyl-L-valyl-L-tyrosine methyl ester (6.42 g) in dimethylformamide (10 ml) and ethanol (30 ml) is added hydrazine hydrate (1.8 ml) and the mixture is allowed to stand at room temperature for 24 hours. Crystals separated are filtered off, washed with cold ethanol and ether and dried over sulfuric acid under reduced pressure; yield 6.26 g, mp 243°–244°C (decomp.), $[\alpha]_D^{22}$–12.0°±0.5° (c=1.01, dimethylformamide).

Anal. Calcd. for $C_{22}H_{28}N_4O_5$: C, 61.67; H, 6.59; N, 13.08. Found: C, 61.50; H, 6.81; N, 12.54.

c. Benzyloxycarbonyl-L-valyl-L-tyrosyl-L-proline methyl ester

To methanol (20 ml) previously chilled in an ice-salt bath are added dropwise thionyl chloride (1.5 ml) and then L-proline (2.0 g). The mixture is kept at room temperature overnight and evaporated under reduced pressure. The resulting sirupy residue is dissolved in water (about 5 ml) and dichloromethane (20 ml) is added. The mixture is chilled and is shaken with ice-cold 50% potassium carbonate (10 ml). The aqueous phase is repeatedly extracted with dichloromethane. The organic extracts are combined, dried over magnesium sulfate and evaporated under reduced pressure to give L-proline methyl ester as free base.

To a chilled solution of benzyloxycarbonyl-L-valyl-L-tyrosine hydrazide (6.0 g) in dimethylformamide (20 ml) and N hydrochloric acid (35 ml) is added ice-cold 2M sodium nitrite (7.7 ml), and the mixture is stirred at 0°C for 4 minutes, after which time the acyldipeptide azide is extracted twice with ice-cold ethyl acetate. The organic extracts are combined, washed with ice-cold M sodium bicarbonate and dried over magnesium sulfate. A solution of the azide thus obtained is added to L-proline methyl ester prepared above and the mixture is kept at 4°C for 2 days. The reaction mixture is then washed with N hydrochloric acid, water and M sodium bicarbonate, dried over magnesium sulfate and evaporated under reduced pressure. The resulting residue (5.9 g) is dissolved in methanol-chloroform (5:95, v/v) and the solution is submitted to a column of silica gel (E. Merck, .05–0.2 mm, 170 g) which has been prepared with the same methanol-chloroform mixture. This solvent system is also used for elution. Fractions containing a major component (Rf=0.57, sulfuric acid burning) in thin-layer chromatography (Silica gel G, methanol-chloroform (1:0, v/v, as solvent) are pooled and evaporated under reduced pressure to afford the desired tripeptide as a foamy residue; yield 5.44 g, $[\alpha]_D^{22}$–60.6°±1.0° (c=1.01, methanol).

Anal. Calcd. for $C_{28}H_{35}N_3O_7$: C, 63.98; H, 6.71; N, 8.00. Found: C, 63.70; H, 6.77; N, 8.00.

d. N -Benzyloxycarbonyl-N -t-butyloxycarbonyl-L-lysyl-L-valyl-L-tyrosyl-L-proline methyl ester Benzyloxycarbonyl-L-valyl-L-tyrosyl-L-proline methyl ester (2.63 g) is dissolved in methanol and is hydrogenated over palladium for 3 hours. After removal of the catalyst by filtration, the solvent is evaporated under reduced pressure to give L-valyl-L-tyrosyl-L-proline methyl ester as free base. N -Benzyloxycarbonyl-N -t-butyloxycarbonyl-L-lysine (derived from the dicyclohexylamine salt (2.82 g) in the usual manner) and the tripeptide ester obtained above are dissolved in dichloromethane and to this is added a dichloromethane solution of dicyclohexylcarbodiimide (1.03 g) at 0°C. The mixture is kept at 4°C overnight and after removal of the dicyclohexylurea separated, the solvent is evaporated under reduced pressure. The residue is dissolved in ethyl acetate and the solution is washed with ice-cold N hydrochloric acid, water and M sodium bicarbonate, and dried over magnesium sulfate. Removal of the solvent by evaporation under reduced pressure yields a colorless foamy residue, which is precipitated from ethyl acetate-ether; yield 3.61 g, $[\alpha]_D^{22}$–56.3°±1.0° (c=1.00, methanol).

Anal. Calcd. for $C_{39}H_{55}N_5O_{10}$: C, 62.13; H, 7.35; N, 9.29. Found: C, 62.13; H, 7.35; N, 9.20.

e. Benzyloxycarbonyl-L-valyl-N -t-butyloxycarbonyl-L-lysyl-L-valyl-L-tyrosyl-L-proline methyl ester N -Benzyloxycarbonyl-N -t-butyloxycarbonyl-L-lysyl-L-valyl-L-tyrosyl-L-proline methyl ester (1.51 g) is hydrogenated in methanol over palladium for 3 hours. After the catalyst has been filtered off, the filtrate is evaporated under reduced pressure to yield N -t-butyloxycarbonyl-L-lysyl-L-valyl-L-tyrosyl-L-proline methyl ester as a foamy residue. The tetrapeptide ester is dissolved in dichloromethane along with benzyloxcarbonyl-L-valine (0.50 g) and to this is added at 0°C a solution of dicyclohexylcarbodiimide (0.41 g) in dichloromethane. The mixture is allowed to stand at 4°C overnight. The dicyclohexylurea separated is removed by filtration and the filtrate is evaporated under reduced pressure. The residue is redissolved in ethyl acetate and the solution is successively washed with ice-cold N hydrochloric acid, water and M sodium bicarbonate, dried over magnesium sulfate and evaporated under reduced pressure. The resulting residue is precipitated from ethyl acetate-ether (1.43 g), and reprecipitated from acetonitrile; yield 1.14 g, $[\alpha]_D^{22}$–66.4°±1.1° (c=1.03, methanol).

Anal. Calcd. for $C_{44}H_{64}N_6O_{11}$: C, 61.95; H, 7.56; N, 9.85. Found: C, 61.87; H, 7.66; N, 10.05.

f. N -Benzyloxycarbonyl-N -t-butyloxycarbonyl-L-lysyl-N$^G$-nitro-L-arginyl-N$^G$-nitro-L-arginyl-L-prolyl-L-valyl-N -t-butyloxycarbonyl-L-lysyl-L-valyl-L-tyrosyl-L-proline methyl ester Benzyloxycarbonyl-L-valyl-N -t-butyloxycarbonyl-L-lysyl-L-valyl-L-tyrosyl-L-proline methyl ester (0.51 g) is hydrogenated in methanol over palladium for 3 hours. The catalyst is filtered off and the solvent is removed by evaporation under reduced pressure. The residue is dried over sodium hydroxide pellets and is then dissolved in dimethylformamide (2 ml). To this solution are added N -benzyloxycarbonyl-N -t-butyloxycarbonyl-L-lysyl-N$^G$-nitro-L-arginyl-N$^G$-nitro-L-arginyl-L-proline (0.53 g) and N-hydroxysuccinimide (0.10 g), and a solution of dicyclohexylcarbodiimide (0.19 g) in dichloromethane (8 ml) is introduced at 0°C. The mixture is kept at 4°C for 2 days and is then added dropwise into ethyl acetate-ether (1:1, 100 ml) to afford precipitates, which are washed with ether and dried (1.13 g). These precipitates are dissolved in methanol-chloroform (1:9, v/v) and the solution is submitted to a column of silica gel (E. Merck, 0.05–0.2 mm, 40 g) which has been prepared with methanol-chloroform (1:9, v/v). Elution is carried out with the same solvent system. Fractions containing a major component (Rf=0.25, sulfuric acid burning) in thin-layer chromatography (Silica gel G, methanol-chloroform (1:9, v/v) as solvent) are pooled, evaporated under reduced pressure and lyophilized from acetic acid to give the desired nonapeptide; yield 0.48 g, $[\alpha]_D^{22}$ −74.8°±1.2° (c=1.00, methanol).

Anal. Calcd. for $C_{72}H_{113}N_{19}O_{21}\cdot H_2O$: C, 54.09; H, 7.25; N, 16.65. Found: C, 54.06; H, 7.35; N, 16.40.

g.
N -t-Butyloxycarbonyl-L-lysyl-L-prolyl-L-valyl-glycyl-N -t-butyloxycarbonyl-L-lysyl-N -t-butyloxycarbonyl-L-lysyl-L-arginyl-L-arginyl-L-prolyl-L-valyl-N -t-butyloxycarbonyl-L-lysyl-L-valyl-L-tyrosyl-L-proline methyl ester N -Benzyloxycarbonyl-N -t-butyloxycarbonyl-L-lysyl-L-nitroarginyl-L-nitroarginyl-L-prolyl-L-valyl-N -t-butyloxycarbonyl-L-lysyl-L-valyl-L-tyrosyl-L-proline methyl ester (0.39 g) is hydrogenolysed over palladium in 90% acetic acid for 6 hours. After removal of the solvent by evaporation under reduced pressure, the residue is lyophilized from acetic acid to give N -t-butyl-oxycarboyl-L-lysyl-L-arginyl-L-arginyl-L-prolyl-L-valyl-N -t-butyloxycarbonyl-L-lysyl-L-valyl-L-tyrosyl-L-proline methyl ester (0.42 g).

To a chilled solution of N -benzyloxycarbonyl-N -t-butyloxycarbonyl-L-lysyl-L-prolyl-L-valyl-glycyl-N -t-butyloxycarbonyl-L-lysine hydrazide (0.32 g) in 90% tetrahydrofuran (5 ml) are successively added ice-cold N hydrochloric acid (0.9 ml) and 2M sodium nitrite (0.2 ml) and the mixture is stirred at 0°C for 4 minutes. To this are then added ice-cold ethyl acetate (15 ml) and M sodium bicarbonate (5 ml). The organic layer is washed again with ice-cold M sodium bicarbonate and dried over magnesium sulfate at 0°C. The resulting solution of the pentapeptide azide is added to a mixture of the nonapeptide obtained above and triethylamine (0.067 ml) in dimethylformamide (3 ml). The mixture is concentrated under reduced pressure at a bath temperature of 20°C until the precipitates which has separated disappears and is kept at 4°C for 2 days. An additional quantity of the azide (prepared from 0.18 mmole of the hydrazide as above) is added. The mixture is kept at 4°C overnight and is then introduced into ether (100 ml). The precipitates which separated are filtered off, washed with ether and dried under reduced pressure (0.68 g). Reprecipitation from methanol-ethyl acetate gives a crude preparation of N--benzyloxycarbonyl-N -t-butyloxycarbonyl-L-lysyl-L-prolyl-L-valyl-glycyl-N -t-butyloxycarbonyl-L-lysyl-N t-butyloxycarbonyl-L-lysyl-L-arginyl-L-arginyl-L-prolyl-L-valyl-N -t-butyloxycarbonyl-L-lysyl-L-valyl-L-tyrosyl-L-proline methyl ester (0.65 g).

A 0.200 g-portion of the tetradecapeptide obtained above is hydrogenated over palladium in 90% acetic acid for 3.5 hours. After removal of the solvent by evaporation under reduced pressure, the residue is lyophilized from acetic acid to yield a crude preparation of the N -free tetradecapeptide. This is submitted for purification to chromatography on a column (1.7 × 33 cm) of carboxymethyl cellulose (Serva, 0.70 meq/g) using an ammonium acetate buffer (pH 5.9, 2000 ml) with a linear concentration gradient of 0.005–0.25M. Eight ml-fractions are collected and their absorptivity at 275 mµ is recorded. The fractions corresponding to a main peak (tubes 111–140) are pooled and the bulk of the solvent is removed by evaporation under reduced pressure. Subsequent lyophilization of the residue yields a pure preparation of the desired peptide; yield 0.154 g, $[\alpha]_D^{21}$ −67.0°±2° (c=0.551, methanol).

h.
Benzyloxycarbonyl-α-aminoisobutyryl-L-tyrosyl-L-seryl-L-methionine hydrazide To an ice-cold solution of benzyloxycarbonyl-α-amino-isobutyryl-L-tyrosine hydrazide (2.3 g) in N hydrochloric acid (15 ml) is added dropwise ice-cold 2M sodium nitrite (3.0 ml) and the mixture is stirred for 5 minutes, after which time the azide is extracted with ice-cold ethyl acetate. The organic extract is washed three times with ice-cold M sodium bicarbonate and dried over magnesium sulfate at 0°C. An ethyl acetate solution of the dipeptide azide thus obtained is added to a solution of L-seryl-L-methionine methyl ester (derived from 5 mmoles of t-butyloxycarbonyl-L-seryl-L-methionine methyl ester) in dimethylformamide (5 ml) and the mixture is kept at 4°C for 65 hours. When the reaction is completed the mixture is washed successively with N hydrochloric acid, water and M sodium bicarbonate, dried over magnesium sulfate and evaporated under reduced pressure to give a foamy residue, which is twice reprecipitated from ethyl acetate-ether to afford a crude preparation of the tetrapeptide methyl ester (2.81 g). The crude ester is then dissolved in ethyl alcohol (25 ml) and hydrazine hydrate (2.4 ml) is introduced. The mixture is kept at room temperature overnight. Most of the solvent is removed by evaporation under reduced pressure and the residue is shaken with water (10 ml) and ethyl acetate (20 ml). The aqueous layer is extracted with ethyl acetate two more times. The organic solutions are combined, washed with water. Gelatinous precipitates, which separated upon evaporation of the ethyl acetate solution, are collected, washed with cold ethyl acetate and ether and dried under reduced pressure (2.47 g). Reprecipitation from ethanolethyl acetate affords the pure tetrapeptide hydrazide; yield 1.86 g.

i.
Benzyloxycarbonyl-α-aminosiobutyryl-L-tyrosyl-L-seryl-L-methionyl-γ-benzyl-L-glutamyl-L-histidyl-L-phenylalanyl-L-arginyl-L-tryptophyl-glycine t-Butyloxycarbonyl-Γ-benzyl-L-glutamyl-L-histidyl-L-phenylalanyl-L-arginyl-L-tryptophyl-glycine (0.23 g) is dissolved in trifluoroacetic acid (ca. 1.5 ml) and the mixture is kept at room temperature for 30 minutes. Addition of ether yields precipitates which are filtered off, washed with ether and dried to give the N -free hexapeptide (0.24 g).

Benzyloxycarbonyl-α-aminoisobutyryl-L-tyrosyl-L-seryl-L-methionine hydrazide (0.25 g) is dissolved in dimethylformamide (1 ml) and N hydrochloric acid (1 ml) is added. The mixture is chilled in ice and to this is added ice-cold 2M sodium nitrite (0.22 ml). The resulting azide is extracted with ice-cold ethyl acetate. The organic extract is washed with ice-cold M sodium bicarbonate, dried over magnesium sulfate and is then combined with a solution of the hexapeptide obtained above and triethylamine (0.125 ml) in diemthylformamide (5 ml). The mixture is concentrated under reduced pressure at a bath temperature of 15° – 20°C until it becomes clear and is kept at 4°C for 40 hours. The reaction mixture is then introduced into ethyl acetate-ether (1:1 by volume, 100 ml) and the precipitates which separated are filtered off, washed with ethyl acetate and ether, and lyophilized from acetic acid (0.32 g).

j.
α-Aminoisobutyryl-L-tyrosyl-L-seryl-L-methionyl-L-glutamyl-L-histidyl-L-phenylalanyl-L-arginyl-L-tryptophylglycyl-L-lysyl-L-prolyl-L-valyl-glycyl-L-lysyl-L-lysyl-L-arginyl-L-arginyl-L-prolyl-L-valyl-L-lysyl-L-valyl-L-tyrosyl-L-proline methyl ester To a solution of benzyloxycarbonyl-α-aminoisobutyryl-L-tyrosyl-L-seryl-L-methionyl-γ-benzyl-L-glutamyl-L-histidyl-L-phenylalanyl-L-arginyl-L-tryptophyl-glycine (0.257 g) in acetic acid is added N hydrochloric acid in acetic acid (0.3 ml) and the mixture is immediately lyophilized and dried under reduced pressure over sodium hydroxide pellets. The resulting decapeptide hydrochloride is dissolved in dimethylformamide (3 ml) together with N-hydroxysuccinimide (0.069 g) and N,N'-dicyclohexylcarbodiimide (0.12 g) is added. The mixture is allowed to stand at 4°C for 24 hours and the urea which has separated is removed by filtration. The filtrate is then introduced into ice-cold ethyl acetate-ether (1:1 by volume) and the precipitates which formed are collected by filtration, washed with ethyl acetate and ether and dried under reduced pressure to give the decapeptide active ester (0.29 g).

The tetradecapeptide, N -t-butyloxycarbonyl-L-lysyl-L-prolyl-L-valyl-glycyl-N -t-butyloxycarbonyl-L-lysyl-N -t-butyloxycarbonyl-L-lysyl-L-arginyl-L-arginyl-L-prolyl-L-valyl-N -t-butyloxycarbonyl-L-lysyl-L-valyl-L-tyrosyl-L-proline methyl ester acetate (0.248 g) is dissolved in dimethylformamide (2 ml) and triethylamine (0.15 ml) is added. To this solution is added a dimethylformamide solution of the decapeptide active ester obtained above, and the mixture is kept at 4°C for 48 hours. The reaction mixture is then introduced into ice-cold ethyl acetate (100 ml) and the precipitates which separated are filtered off, washed with ethyl acetate and ether, lyophylized from acetic acid and dried over sodium hydroxide pellets under reduced pressure, affording the crude protected tetracosapeptide (0.48 g).

The protected peptide (0.20 g) obtained above is treated with anhydrous hydrogen fluoride at 0°C for 90 minutes in the usual manner in the presence of methionine (0.05 g) and anisole (0.2 ml) as radical scavengers. After removal of hydrogen fluoride by evaporation under reduced pressure, the residue is dissolved in water and the solution is washed with ethyl acetate. The aqueous solution is then passed through a column of Amberlite CG-400 (acetate form); the column is washed with portions of water. The combined solution is concentrated under reduced pressure and lyophilized. The crude deblocked peptide thus obtained is submitted to chromatography on a column of carboxymethyl cellulose (Serva, 0.70 meq/g) using an ammonium acetate buffer (pH 6.5, 2,000 ml) with a linear concentration gradient of 0.02-0.6M, in the same manner as that described in Example 2. Thus, α-aminoisobutyryl-L-tyrosyl-L-seryl-L-methionyl-L-glutamyl-L-histidyl-L-phenylalanyl-L-arginyl-L-tryptophyl-glycyl-L-lysyl-L-prolyl-L-valyl-glycyl-L-lysyl-L-lysyl-L-arginyl-L-arginyl-L-prolyl-L-valyl-L-lysyl-L-valyl-L-tyrosyl-L-proline methyl ester is obtained (0.074 g), $[\alpha]_D^{21}$ −75°±2° (c=0.5, 0.1N acetic acid).

EXAMPLE 5

Ibu$^1$—ACTH(1-18)—NH$_2$ acetate (0.5 mg) is dissolved in 40 mM zinc chloride (0.25 ml) at room temperature, and to the solution is added a solution (0.25 ml) of 40 mM disodium hydrogenphosphate containing sodium chloride (4.5 mg). Thus, a suspension of the desired complex is obtained, and it is adjusted to pH 7.0 by the addition of 0.1N sodium hydroxide.

EXAMPLE 6

Ibu$^1$—ACTH(1-18)—NH$_2$ acetate (0.5 mg) is dissolved in distilled water (0.15 ml). To the solution is added a solution (0.1 ml) of poly-L-glutamic acid (0.5 mg; molecular weight-about 1,500-2,000) which has been neturalized with 0.1N sodium hydroxide. The mixture is stirred for several minutes, and to this is added a solution (0.25 ml) of M/30 phosphate buffer containing sodium chloride (4.5 mg.) The resulting complex preparation is adjusted to pH 7.0 with 0.1N sodium hydroxide.

EXAMPLE 7

Ibu$^1$—ACTH(1-18)—NH$_2$ acetate (1.0 mg) is dissolved in distilled water (0.2 ml). To the solution is added, while stirring, a solution of poly-L-aspartic acid (2 mg; molecular weight-about 3,000) which has been neutralized with 0.1N sodium hydroxide (0.3 ml) before use, and thus a suspension of white precipitates is formed. The desired suspension of the complex is prepared by adding to the suspension a solution (0.5 ml; pH 6.8) of M/15 disodium hydrogenphosphate-potassium dihydrogenphosphate containing sodium chloride (9.0 mg) and adjusting the suspension to pH 7.0 with 0.1N sodium hydroxide.

EXAMPLE 8

Ibu$^1$—ACTH(1-18)—NH$_2$ acetate (0.5 mg) is dissolved in 100 mM zinc chloride (0.15 ml). On the other hand, poly-L-glutamic acid (0.5 mg; molecular weight-about 2,000-3,000) is neutralized with 0.1N sodium hydroxide (0.1 ml), and to the solution is added sodium chloride (4.5 mg) and 40 mM disodium hydrogenphosphate (0.25 ml). Thus obtained solutions are combined and stirred at room temperature to make a suspension of the desired complex, which is neutralized with an appropriate amount of 0.1N sodium hydroxide.

EXAMPLE 9

Ibu$^1$-ACTH(1-18)—NH$_2$ acetate (0.5 mg) is dissolved in water (0.1 ml) at room temperature, and to this is added M/15 potassium dihydrogenphosphate-disodium hydrogenphosphate (0.25 ml) containing 4.5 mg of sodium chloride. Copoly-L-glytamyl-L-tyrosine (20 mg) (molecular weight-21,850) is neutralized by the addition of 0.1N sodium hydroxide (0.15 ml). The neutralized solution is added to the peptide solution obtained above and the mixture is stirred to make a suspension of the desired complex, which is adjusted to pH 7.0 with 0.1N sodium hydroxide.

EXAMPLE 10

Ibu$^1$—ACTH(1-18)—NH$_2$ acetate (0.5 mg) is dissolved in water (0.1 ml), and to this is added M/15 phosphate buffer (0.25 ml) (pH 7.0) containing 4.5 mg of sodium chloride. Copoly-L-glutamyl-L-tyrosine (7 mg; molecular weight-about 21,850) is neutralized with 0.1N sodium hydroxide. The neturalized solution (0.1 ml) is added to the solution of peptide obtained above to give a suspension which immediately becomes clear.

To the solution is added thimerosal (0.1 mg) in water (0.05 ml), and the resulting clear solution is adjusted to pH 7.0 by the addition of 0.1N sodium hydroxide.

EXAMPLE 11

Ibu$^1$—Orn$^{15}$—ACTH(1-18)-NH$_2$ acetate (0.5 mg) is dissolved in 40 mM zinc chloride (0.25 ml) at room temperature, and to the solution is added a solution (0.25 ml) of 40 mM disodium hydrogenphosphate containing sodium chloride (4.5 mg). Thus, a suspension of the desired complex is obtained, and it is adjusted to pH 7.0 by the addition of an appropriate amount of 0.1N sodium hydroxide.

EXAMPLE 12

Ibu$^1$—ACTH(1-24)—OMe acetate (0.5 mg) is dissolved in 40 mM zinc chloride (0.25 ml) at room temperature, and to the solution is added a solution (0.25 ml) of 40 mM disodium hydrogenphosphate containing sodium chloride (0.45 mg). Thus, a suspension of the desired complex is obtained, and it is adjusted to pH 7.0 by the addition of an appropriate amount of 0.1N sodium hydroxide.

EXAMPLE 13

Ibu$^1$—ACTH(1-27)—OH acetate (0.5 mg) is dissolved in 40 mM zinc chloride (0.25 ml) at room temperature, and to the solution is added a solution (0.25 ml) of 40 mM disodium hydrogenphosphate containing sodium chloride (0.45 mg). Thus, a suspension of the desired complex is obtained, and it is adjusted to pH 7.0 by the addition of an appropriate amount of 0.1N sodium hydroxide.

In a similar manner as above, the other 1-α-aminoisobutyric acid corticotropin peptides can be converted into the corresponding complexes.

What we claim:

1. A member selected from the group consisting of α-aminoisobutyryl-L-tyroxyl-L-seryl-L-methionyl-L-glutamyl-L-histidyl-L-phenylalanyl-L-arginyl-L-tryptophyl-glycyl-L-lysyl-L-prolyl-L-valyl-glycyl-L-lysyl-L-lysyl-L-arginyl-L-arginine amide and non-toxic acid addition salts thereof.

2. A member selected from the group consisting of α-aminoisobutyryl-L-tyrosyl-L-seryl-L-methionyl-L-glutamyl-L-histidyl-L-phenylalanyl-L-arginyl-L-tryptophyl-glycyl-L-lysyl-L-prolyl-L-valyl-glycyl-L-ornithyl-L-lysyl-L-arginyl-L-arginine amide and non-toxic acid addition salts thereof.

3. A member selected from the group consisting of α-aminoisobutyryl-L-tyrosyl-L-seryl-L-methionyl-L-glutamyl-L-histidyl-L-phenylalanyl-L-arginyl-L-tryptophyl-glycyl-L-lysyl-L-prolyl-L-valyl-glycyl-L-lysyl-L-lysyl-L-arginyl-L-valyl-L-prolyl-L-arginyl-L-lysyl-L-valyl-L-tyrosyl-L-prolyl-L-aspartyl-L-alanyl-glycine and non-toxic acid addition salts thereof.

* * * * *